(12) United States Patent
Churchill et al.

(10) Patent No.: US 12,330,293 B1
(45) Date of Patent: Jun. 17, 2025

(54) BRAKING ASSEMBLY FOR APPLYING A CONTROLLABLE BRAKING FORCE TO A ROTATABLE JOINT

(71) Applicant: Amazon Technologies, Inc., Seattle, WA (US)

(72) Inventors: Phil Churchill, Hubbardston, MA (US); Beth A. Marcus, Bedford, MA (US); Hunter Sawyer, Beverly, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 799 days.

(21) Appl. No.: 16/915,423

(22) Filed: Jun. 29, 2020

(51) Int. Cl.
*B25J 19/00* (2006.01)
*B25J 9/00* (2006.01)
(Continued)

(52) U.S. Cl.
CPC ......... *B25J 19/0004* (2013.01); *B25J 9/0009* (2013.01); *B25J 9/104* (2013.01);
(Continued)

(58) Field of Classification Search
CPC ......... Y10T 74/20317; Y10T 74/20305; Y10S 901/31; B25J 9/042; B25J 19/0004; B25J 15/0052; B25J 9/161; B25J 19/0009; B25J 9/104; B25J 9/109; B25J 9/123; B25J 17/00; B25J 9/0006; B25J 9/0009; B23Q 2703/02; F16D 49/10; F16D 65/065; F16D 65/28; F16D 2125/60; F16D 2125/64; F16D 2121/24; F18D 2121/24; A61H 2201/1207; A61H 2205/10; A61H 1/0277; A61H 1/0285; A61H 2201/1657; A61F 2/64;
(Continued)

(56) References Cited

U.S. PATENT DOCUMENTS 2,465,164 A * 3/1949 Maier ...................... B66D 5/26
188/77 R
2,928,505 A * 3/1960 Wilson ..................... B66D 5/26
188/151 R
(Continued)

FOREIGN PATENT DOCUMENTS

JP 2004068847 A * 3/2004

OTHER PUBLICATIONS

EP 338966A1 (Year: 2018).*
(Continued)

*Primary Examiner* — Robert A. Siconolfi
*Assistant Examiner* — Mahbubur Rashid
(74) *Attorney, Agent, or Firm* — Lindauer Law, PLLC

(57) ABSTRACT

Rotatable joints may include one or more braking assemblies. The one or more braking assemblies may control a degree of movement of the rotatable joint to provide a range of damping. In some instances, the braking assemblies may include brake band(s) that tighten and loosen around a hub, or other rotatable member of the rotatable joint. The amount of braking, or tautness of the brake band(s), may be variably controlled to arrest the hub by different amounts. In some instances, the tightening of the brake band(s) around the hub may be controlled using linear actuator(s) and/or magnetic element(s). Implementing braking assemblies having controlled actuation may improve control of rotatable joints without adding cost, complexity, weight, or bulk.

20 Claims, 9 Drawing Sheets

(51) Int. Cl.
*B25J 9/10* (2006.01)
*B25J 9/12* (2006.01)
*B25J 17/00* (2006.01)
*F16D 49/10* (2006.01)
*F16D 65/06* (2006.01)
*F16D 65/28* (2006.01)
*B25J 9/16* (2006.01)
*F16D 121/24* (2012.01)
*F16D 125/60* (2012.01)
*F16D 125/64* (2012.01)

(52) U.S. Cl.
CPC .............. *B25J 9/109* (2013.01); *B25J 9/123* (2013.01); *B25J 17/00* (2013.01); *F16D 49/10* (2013.01); *F16D 65/065* (2013.01); *F16D 65/28* (2013.01); *B25J 9/0006* (2013.01); *B25J 9/161* (2013.01); *F16D 2121/24* (2013.01); *F16D 2125/60* (2013.01); *F16D 2125/64* (2013.01)

(58) Field of Classification Search
CPC .... A61F 2002/6818; A61F 2/68; A61F 2/604; A61F 2002/6854; A61F 5/0125; A61F 2005/0158; A61F 2/741; A61F 2/58; A61F 2/60; A61F 2002/5038; A61F 2005/0155; A61F 2210/009; A61F 5/01
See application file for complete search history.

(56) References Cited

U.S. PATENT DOCUMENTS

| | | | | |
|---|---|---|---|---|
| 3,557,911 | A * | 1/1971 | Ellard | F16D 49/12 |
| | | | | 188/77 R |
| 3,907,075 | A * | 9/1975 | Christison | B66D 5/26 |
| | | | | 192/81 C |
| 4,168,768 | A * | 9/1979 | Johnson | F16D 65/28 |
| | | | | 188/204 A |
| 4,241,813 | A * | 12/1980 | Van De Sompele | F16D 49/12 |
| | | | | 192/99 B |
| 4,420,885 | A * | 12/1983 | Todero | B27B 17/083 |
| | | | | 188/77 R |
| 4,593,796 | A * | 6/1986 | Farquhar | F16D 49/08 |
| | | | | 188/77 R |
| 5,184,601 | A * | 2/1993 | Putman | A61B 34/30 |
| | | | | 901/17 |
| 5,351,676 | A * | 10/1994 | Putman | A61B 90/00 |
| | | | | 600/117 |
| 5,597,146 | A * | 1/1997 | Putman | A61B 90/50 |
| | | | | 248/176.2 |
| 5,722,515 | A * | 3/1998 | Wyse | F16D 49/10 |
| | | | | 280/47.27 |
| 5,899,869 | A * | 5/1999 | Barrack, Jr. | A61F 5/0125 |
| | | | | 602/16 |
| 6,500,138 | B1 * | 12/2002 | Irby | F16D 41/206 |
| | | | | 623/44 |
| 6,948,598 | B2 | 9/2005 | Koike et al. | |
| 8,342,998 | B2 * | 1/2013 | Fujii | B60W 10/11 |
| | | | | 475/116 |
| 8,371,421 | B2 | 2/2013 | Jesse et al. | |
| 9,677,602 | B1 * | 6/2017 | Baghdasarian | B25J 19/0004 |
| 9,730,824 | B2 * | 8/2017 | Gilbert | A61F 5/013 |
| 9,759,321 | B1 * | 9/2017 | Fortl | F16D 66/00 |
| 10,035,687 | B2 * | 7/2018 | Nield | B66D 5/26 |
| 10,661,453 | B2 * | 5/2020 | Koenig | G16H 20/40 |
| 11,022,191 | B1 * | 6/2021 | Marcus | B25J 9/1641 |
| 2011/0001102 | A1 * | 1/2011 | Hossler | B66D 5/10 |
| | | | | 254/322 |
| 2015/0272765 | A1 * | 10/2015 | Gilbert | A61F 5/013 |
| | | | | 602/16 |
| 2017/0112505 | A1 | 4/2017 | Morash | |
| 2017/0291314 | A1 | 10/2017 | Hosek et al. | |
| 2018/0079090 | A1 | 3/2018 | Koenig et al. | |
| 2018/0180139 | A1 * | 6/2018 | Wafzig | F16H 63/345 |
| 2019/0118372 | A1 * | 4/2019 | Sasaki | B25J 9/101 |
| 2019/0152056 | A1 | 5/2019 | Mottram et al. | |
| 2020/0124163 | A1 | 4/2020 | Klassen | |

OTHER PUBLICATIONS

CN 110594318A (Year: 2019).*
DE 102009054672 A1 (Year: 2011).*
RU 182514 U1 (Year: 2018).*
JP 4485306 B2 (Year: 2010).*
DE 3611093 C2 (Year: 1992).*

* cited by examiner

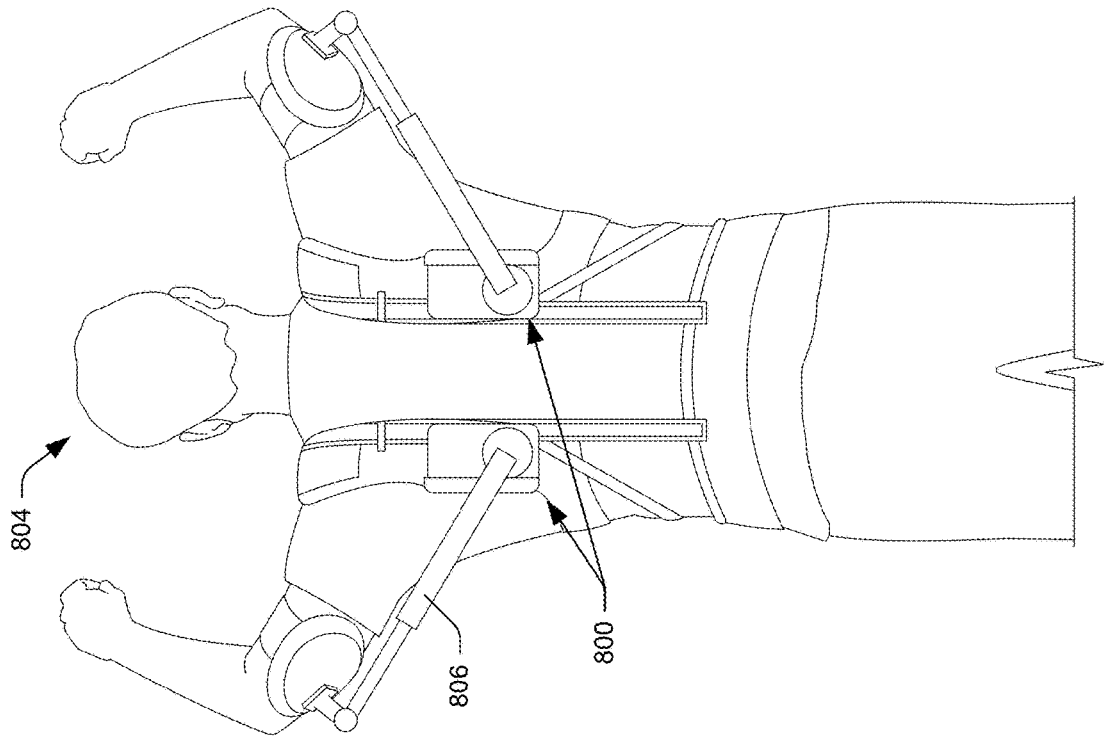
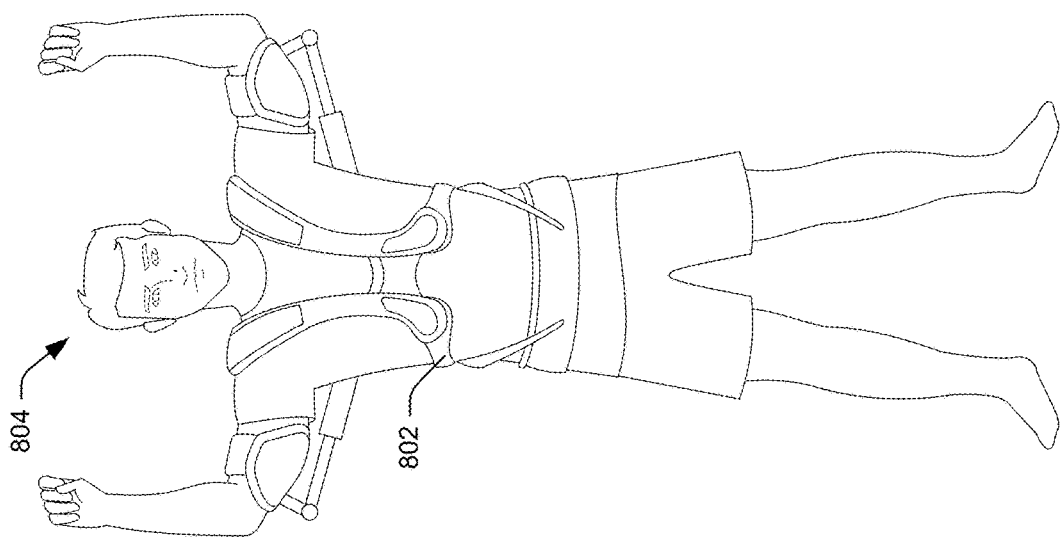
FIG. 8A
FIG. 8B

BRAKING ASSEMBLY FOR APPLYING A CONTROLLABLE BRAKING FORCE TO A ROTATABLE JOINT

BACKGROUND

There are many engineering designs where it is desirable to apply a selective braking force to a rotatable joint. For example, simple hinge mechanisms allow two members to move with respect to one another around a pivot point. The friction of the hinge determines how much force is required to move the members. In many cases, the force is fixed by the inherent or designed friction of the joint. In other designs, locking mechanisms can be added to the joint to prevent movement about the joint.

In some designs, it is desirable to supply a continually selective braking force to a joint so that the force required to move the connected members can be controlled anywhere between some minimum value and a maximum value (e.g. fully locked). One environment where this is desirable is in the design of anatomic braces to help support a load carried by wearer. With a brace, support members are secured to a person's body with one or more hinges located near movable body joints. For example, a shoulder brace can be secured to a person's upper back with a support member extending along the upper arm and one or more rotatable joints in the area of the shoulder. In this environment, it is advantageous to selectively control the force required to move the at least one of the hinge joints. For example, the braking force may be lessened when the wearer uses their muscles to pick up an object and may be increased to prevent rotation in the opposite direction desired and help support the load with the brace members while the object is being carried. Other examples can include leg braces where the force required to move a joint by the wearer's knee can be made minimal when the wearer is walking but may need to be increased to support standing or sitting with little or no muscle use. Another environment where selective control over a joint is needed is in the field of robotics where braking can be used to prevent joints from rotating too fast or to support loads carried by a robot.

One conventional way of providing a selective braking force is with a motor. The motor can be energized to provide a force to move a hinge joint when desired and geared so that the motor can be backdriven (e.g., moved) when power is not supplied. However, motors are heavy, bulky, and/or require substantial power to operate if the gear ratio is limited so that they can be easily backdriven when desired. Given this problem, there is a need for a mechanism that can generate a selective braking force to a rotatable joint that is simple, lightweight, allows fine adjustment of the braking force, eliminates or reduces the need for a motor, and does not require the continual application of electrical power and the dissipation of heat to operate.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. The systems and devices depicted in the accompanying figures are not to scale and components within the figures may be depicted not to scale with each other.

FIGS. 8A and 8B illustrate rotatable joints with a controllable braking force integrated into a brace that is worn by a user, according to an embodiment of the present disclosure.

DETAILED DESCRIPTION

Figure 1:
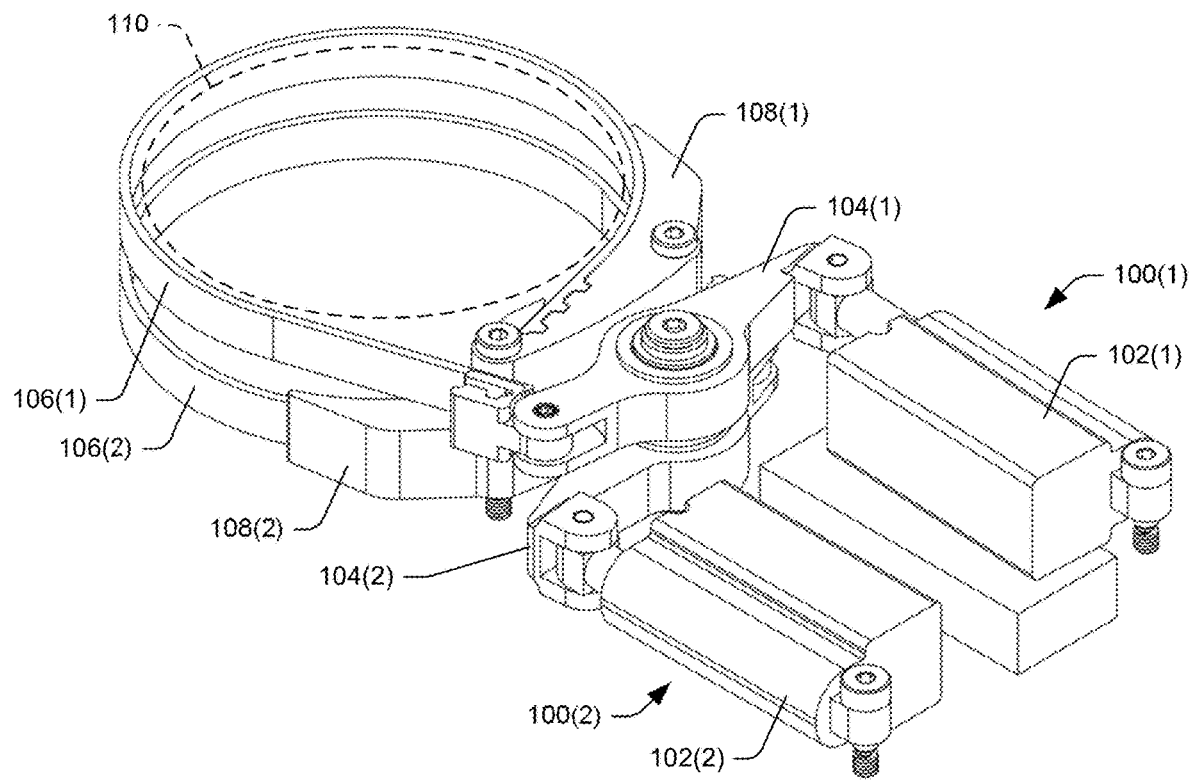
FIG. 1 illustrates a pair of braking assemblies that may be used to selectively control a force required to move a rotatable joint, according to an embodiment of the present disclosure.

Described herein are, among other things, one or more braking assemblies that apply a real time, controllable braking force to a rotatable joint, or articulated structure including a rotatable member. The one or more braking assemblies may control a force required to impart a degree of movement of the rotatable joint. As will be explained in further detail below, the braking assembly includes one or more brake bands that can be selectively tightened around a hub or pivot pin of a rotatable joint in order to control how much force is required to rotate the joint around the hub or pivot pin that is located within the brake bands. In some instances, one end of the band is fixed and the other end of the band is tightened by an actuator, such as a linear actuator, that applies a tension to the end of the band to control the braking force. In some instances, the actuators are mechanically coupled to the ends of the bands and in other instances, the actuators are magnetically coupled to the ends of the bands. The amount of braking, or tautness of the band(s), can be variably controlled to apply different braking forces to the joint. For example, an amount of force required to move the rotatable joint is dependent in part upon an amount of braking applied by the braking assemblies. In some instances, the tightening of the band(s) around the hub may be controlled using non-backdrivable linear actuator(s) and/ or magnetic element(s). Such linear actuators can supply a constant braking force even if not powered.

The braking assemblies include brake band(s) that wrap at least partially around the hub (e.g., encircle) for controlling or arresting movement of the rotatable joint. For example, the bands are capable of being tightened and loosened to resist or permit movement of the hub, and correspondingly, the joint. When the bands are tightened around the hub (e.g., pulled taut), the hub may be locked and movement of the rotatable joint may be prevented. In some instances, in the fully locked state, a ratcheting mechanism may be used to engage the band at the end of the travel. On the other hand, if the band brakes are loosened around the hub, the rotatable joint can move freely. By selectively tightening one or more of the bands, the force required to move the rotatable joint can be controlled in real time. Furthermore, as will be explained in detail below, each band may be independently tightened or loosened to allow the force required to move the joint in different directions to be asymmetrical.

For example, the band(s) may be tightened to certain amounts to control the force required to move the rotatable joint (i.e., by overcoming the braking force or friction applied by the band(s)). If the joint is used in a body brace, the brake bands can be loosened when it is desired that the wearer's muscles will move the joint and tightened when it is desired to support or assist in supporting a weight carried by the limb. In a robotic environment, the braking assemblies may be used to control a stiffness of the rotatable joint based on a tautness of the band(s). In some instances, this varying degree of tautness may offer improved control of the rotatable joint and/or dampen braking of the rotatable joint.

Rotatable joints have a variety of configurations. For purposes of explanation, the braking assembly of the disclosed technology is described with respect to a rotatable joint in which one member has a hub or pivot pin and a second member that is designed to rotate around the hub or pivot pin. The brake bands are secured to the second member and are selectively tightened or loosened to change the force required to move the hub against the friction applied by the bands. In some instances, each band has a first end that is fixed and a second end that is tensioned to control the tightness of the band around the hub. In some embodiments, the second end of the band is connected to a lever arm that transmits a force from an actuator to the free end of the band. The lever arm may be pivotably mounted or coupled to a housing, or other grounding structure, and may have arms of unequal length to provide a mechanical advantage to the force provided by the actuator to tighten the band.

In some embodiments, actuator(s) may function to tighten or loosen the band(s) around the hub. In one embodiment, the lever arm has two arms (or wings) that pivot around a pivot point. The free end of a band is connected to one arm of the lever arm and the actuator is connected to the other arm of the lever arm. Movement of the actuator in one direction causes one arm of the lever arm to move in one direction and the other arm of the lever arm to move in an opposite direction. The arms need not be the same length from the pivot point in order to vary the force exerted by the arms on the band around the hub. Once the actuator is extended (partially or completely), the actuator may maintain the extended position without power being supplied (purely through the friction between the band and the hub and a high gear ratio in the actuator (friction opposing backdrive inside the actuator/transmission assembly). Some actuators may therefore be considered non-backdrivable and may cause the bands to apply a constant braking force to the hub in the absence of electric power.

Additionally, or alternatively, rather than mechanically coupling the actuator to the ends of the brake bands, the ends of the bands can be magnetically coupled to the actuators. In this embodiment, the actuator moves a magnet that repels a corresponding magnet on a lever arm that is coupled to the end of the band to selectively control the tension of the band around the hub. Once the magnetic element(s) coupled to the actuator are extended towards the magnets on the lever arm to which a band is connected, the actuator may maintain the braking force using little or no electric energy (i.e., non-backdrivable). However, in some instances, electromagnet(s) may be selectively turned on and off to tighten the band(s). In such instances, actuators may not be used but rather, the electromagnet(s) may be disposed adjacent to the lever arm for displacing an end of the lever arm and tightening the band(s) around the hub.

In some instances, a rotatable joint may include a first braking assembly and a second braking assembly. The first braking assembly includes a first band wrapped around at least part of the hub in a first direction and the second braking assembly includes a second band wrapped around at least part of the hub in the opposite direction. In some instances, the first band may be wrapped around the hub in a clockwise direction while the second band is wrapped around the hub in a counter-clockwise direction The first band and the second band may include a first end that is anchored (e.g., to the housing or components of the housing) and a second end that is free to be tightened or loosened by an actuator.

In some instances, the first braking assembly and the second braking assembly may be actuated or controlled electronically by an embedded or remote controller and/or other computer system. In some instances, the first braking assembly and the second braking assembly may be independently actuatable to control an amount of braking applied by the first band and the second band, respectively. Additionally, in an embodiment where the first band and the second band are wrapped around the hub in different directions, the first braking assembly and the second braking assembly may selectively control a force required for both clockwise and counter-clockwise rotation of the hub. The first braking assembly and the second braking assembly may also be independently transitioned between open and fully braking configurations, respectively, or anywhere in between, depending on the type of control or the braking force needed. For example, the first band may be pulled to a first tautness and the second band may be pulled to a second tautness that is different than the first tautness.

In some instances, rotatable joints may integrate any number of the braking assemblies discussed herein. Additionally, the rotatable joints may be moveable in more than one degree of freedom and/or multiple rotatable joints may be coupled together to form systems having varying degrees of freedom. Some of the rotatable joints may have braking assemblies and some may not to permit small out of plane motions in system like a brace or exoskeleton thus adapting to the user.

The use of the braking assemblies may reduce the size and complexity of the joints as compared with motorized joints. In some instances, the rotatable joints may find use in manual or powered braces that are worn by humans to function or perform similar movements (e.g., rotate, twist, etc.) to that of human joints (e.g., wrist, shoulder, elbow, knee, etc.). For example, the rotatable joints may be integrated within knee, wrist, and/or back braces to assist humans in movement and/or physical posture. Additionally, or alternatively, the rotatable joints may find use in robotic systems (e.g., robotic arms) for performing automated process (e.g., painting, material handling, assembly, etc.) that are similar to processes performed by humans.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example braking mechanism or assembly for controlling movement of a rotatable joint and/or for supplying a selectively braking force to the rotatable joint, according an embodiment of the present disclosure. In the embodiment shown, the braking assembly includes a first braking assembly 100(1) and/or a second braking assembly 100(2) for variably controlling a force required to move the rotatable joint. In some instances, the first braking assembly 100(1) and the second braking assembly 100(2) may be similar in structure and function. As described in further detail below, in some instances, the first braking assembly 100(1) may be rotated (or in flipped position) relative to the second braking assembly 100(2) to apply differing amounts of braking force in different directions. In other words, one of the first braking assembly 100(1) or the second braking assembly 100(2) may apply a greater braking force in a clockwise direction, while another of the first braking assembly 100(1) or the second braking assembly 100(2) may apply a greater braking force in a counter-clockwise direction.

In some instances, the first braking assembly 100(1) and/or the second braking assembly 100(2) may include respective linear actuators operably coupled to respective bands. For example, the first braking assembly 100(1) may include a first linear actuator 102(1) having a first shaft that extends at various lengths from the first linear actuator 102(1). The first linear actuator 102(1) may be non-backdrivable for holding in position when power is not supplied. A first brake band 106(1) has a first end that is fixed and a second end that is free to be tightened or loosened. The first braking assembly 100(1) may further include a first lever arm 104(1) having two arms (or wings) that extend from a pivot point of the first lever arm 104(1). The first linear actuator 102(1) is electronically controlled to move the first shaft into or out of the body of the first linear actuator 102(1). Meanwhile, one arm of the first lever arm 104(1) is connected at its end to the end of the first shaft of the first linear actuator 102(1) via a hinge or other pivotable connection and the second arm of the first lever arm 104(1) is connected to the free end of the first brake band 106(1) via a hinge or other pivotable connection. Movement of the shaft out of the body of the first linear actuator 102(1) pushes the first arm of the first lever arm 104(1) and pulls the first brake band 106(1) tighter around the area 110, or a portion of the area 110, in which the hub is located (not shown in the center of the bands). Retraction of the first shaft into the body of the first linear actuator 102(1) pulls the first arm of the first lever arm 104(1) towards the first linear actuator 102(1) and pushes the second arm of the first lever arm 104(1) towards the hub thereby loosening the first brake band 106(1). In some instances, the first arm of the first lever arm 104(1) is longer than the second arm of the first lever arm 104(1) such that a force applied to the first arm results in a greater force being applied by the second arm of the first lever arm 104(1). As will be appreciated by those skilled in the art, the amount of braking force supplied by the first brake band 106(1) may depend on several factors including the diameter of the hub, the first brake band 106(1) material, its coefficient of friction and stretch, as well as the force applied by the first linear actuator 102(1) on the end of the first brake band 106(1).

In the embodiment shown, a second braking assembly 100(2) may have similar components as the first braking assembly 100(1), such as a second linear actuator 102(2) having a second shaft that extends from an end of the second linear actuator 102(2) at various lengths. A second brake band 106(2) has one end that is fixed and a second end that is free to be tightened or loosened by the second linear actuator 102(2). In the embodiment shown, the second brake band 106(2) is wound around the hub in the opposite direction of the first brake band 106(1). However, there may be instances where it is desired to have both of the brake bands wound in the same direction around the hub, or the area 110. The second linear actuator 102(2) may be non-backdrivable for holding the braking force when power is not supplied. The second braking assembly 100(2) may further include a second lever arm 104(2) having arms (or wings) that pivot about the same pivot point as the first lever arm 104(1). One arm of the second lever arm 104(2) is operably coupled to the second linear actuator 102(2) and the second arm of the second lever arm 104(2) may be coupled to the free end of the second brake band 106(2).

As discussed in detail herein, the first linear actuator 102(1) and the second linear actuator 102(2) may actuate in a first direction to tighten the first brake band 106(1) and the second brake band 106(2), respectively, around a hub (or other rotational object of the rotatable joint) to resist or restrain movement of the rotatable joint. The first linear actuator 102(1) and the second linear actuator 102(2) may also actuate in a second direction to loosen the first brake band 106(1) and the second brake band 106(2), respectively, around the hub to permit increased movement of the rotatable joint. This design permits a continuously variable level of continuous braking power to be applied to the hub and without expending significant amounts of energy. For example, as shown in FIG. 1, the first brake band 106(1) and the second brake band 106(2) wrap at least partially around the area 110, which may correspond to an area occupied by the hub (or other component) of the rotatable joint. The first brake band 106(1) and the second brake band 106(2) are shown extending around the area 110 to at least partially encircle the area 110. That is, between the free ends and fixed ends of the first brake band 106(1) and the second brake band 106(2), respectively, the first brake band 106(1) and the second brake band 106(2) may include a length that extends at least partially around the area 110, respectively. A first support 108(1) and/or a second support 108(2) are coupled to the fixed ends of the first brake band 106(1) and the second brake band 106(2), respectively, and may also partially extend around circumference of the area 110 to press the first brake band 106(1) and the second brake band 106(2) against the hub. More generally, the free ends of the first brake band 106(1) and the second brake band 106(2) may couple to the first lever arm 104(1) and the second lever arm 104(2), while the fixed ends of the first brake band 106(1) and the second brake band 106(2) are received with the first support 108(1) and the second support 108(2), respectively.

The first linear actuator 102(1) and the second linear actuator 102(2) may be driven to a desired displacement and the braking force may be constant until the position of the first linear actuator 102(1) and/or the second linear actuator 102(2) is changed (e.g., extended or retracted). Once tightened to a desired position, given the non-backdrivable nature of the first linear actuator 102(1) and the second linear actuator 102(2), no energy is required to maintain the desired braking power applied to the hub. As such, the first braking assembly 100(1) and/or the second braking assembly 100(2) may maintain the force required to move a rotatable joint without energizing the first linear actuator 102(1) and/or the second linear actuator 102(2), respectively. However, an amount of braking applied by the first braking assembly 100(1) and the second braking assembly 100(2) may be overcome by applying a force that is greater than a force applied by the first brake band 106(1) and/or the second brake band 106(2).

The area 110 is large enough to permit the hub to rotate freely when the first brake band 106(1) and the second brake band 106(2) are not being tightened by the first linear actuator 102(1) and/or the second linear actuator 102(2), respectively. As such, when the first brake band 106(1) and the second brake band 106(2) are loosened, the first brake band 106(1) and the second brake band 106(2) may not mechanically interfere with the hub rotating. However, when the first brake band 106(1) and/or the second brake band 106(2) are tightened, the first brake band 106(1) and/or the second brake band 106(2) mechanically interfere with the hub.

Introduced above, the first braking assembly 100(1) and/or the second braking assembly 100(2) may be controlled to completely arrest (i.e., rigidly hold) the hub. Alternatively, the first braking assembly 100(1) and/or the second braking assembly 100(2) may be directed to partially dampen or restrain movement of the hub, or to an adjustable extent. In this sense, first braking assembly 100(1) and/or the second braking assembly 100(2) may be used to control a stiffness or rigidity of the rotatable joint. In some instances, the extent of the braking may vary depending upon a number of factors, including the intended speed of a movement of the rotatable joint, a weight of an item held or carried by the rotatable joint, a force applied to the hub, the intended position and orientation of the rotatable joint, the effects of gravity, acceleration, deceleration, and so forth.

The variability of tension applied to the first brake band 106(1) and/or the second brake band 106(2) may also provide the rotatable joint with a dampening effect. For example, using the first brake band 106(1) and/or the second brake band 106(2) may be more efficient to brake or dampen the motion of the hub than conventional techniques that attempt to counteract, counterbalance, or backdrive a motor. Additionally, the use of the braking and dampening may be relied upon to achieve new types of motion. For example, using a combination of braking and continuously-controllable ranges of applied tension to the first brake band 106(1) and/or the second brake band 106(2) (e.g., dampening or restraining) may be more fluid, permit new and more flexible motions, and also facilitate the ability to pick and place items or objects in different ways.

Although the discussion in FIG. 1 relates to using the first linear actuator 102(1) and the second linear actuator 102(2) to tighten the first brake band 106(1) and the second brake band 106(2), respectively, the first braking assembly 100(1) and/or the second braking assembly 100(2) may include other actuators for moving or displacing the first brake band 106(1) and/or the second brake band 106(2). For example, the first brake band 106(1) and/or the second brake band 106(2) may be selectively tightened around the hub using other types of actuators such as one or more cams, motors, cables etc. that may be in the area of the brake bands or remote (e.g. cables pulled from a remote location compared to the bands). Additionally, or alternatively, both ends of the first brake band 106(1) and/or the second brake band 106(2) may be pulled via actuators. In this sense, both ends of the first brake band 106(1) and/or the second brake band 106(2) may be considered free ends that are capable of being pulled to tighten around the hub and pushed to loosen around the hub (or the area 110). In some instances, one end of the first brake band 106(1) and/or the second brake band 106(2) may be coupled directly to the first linear actuator 102(1) and the second linear actuator 102(2), respectively, while an opposite end of the first brake band 106(1) and/or the second brake band 106(2) may be secured to the first support 104(1) and the second support 104(2), respectively.

Figure 2:
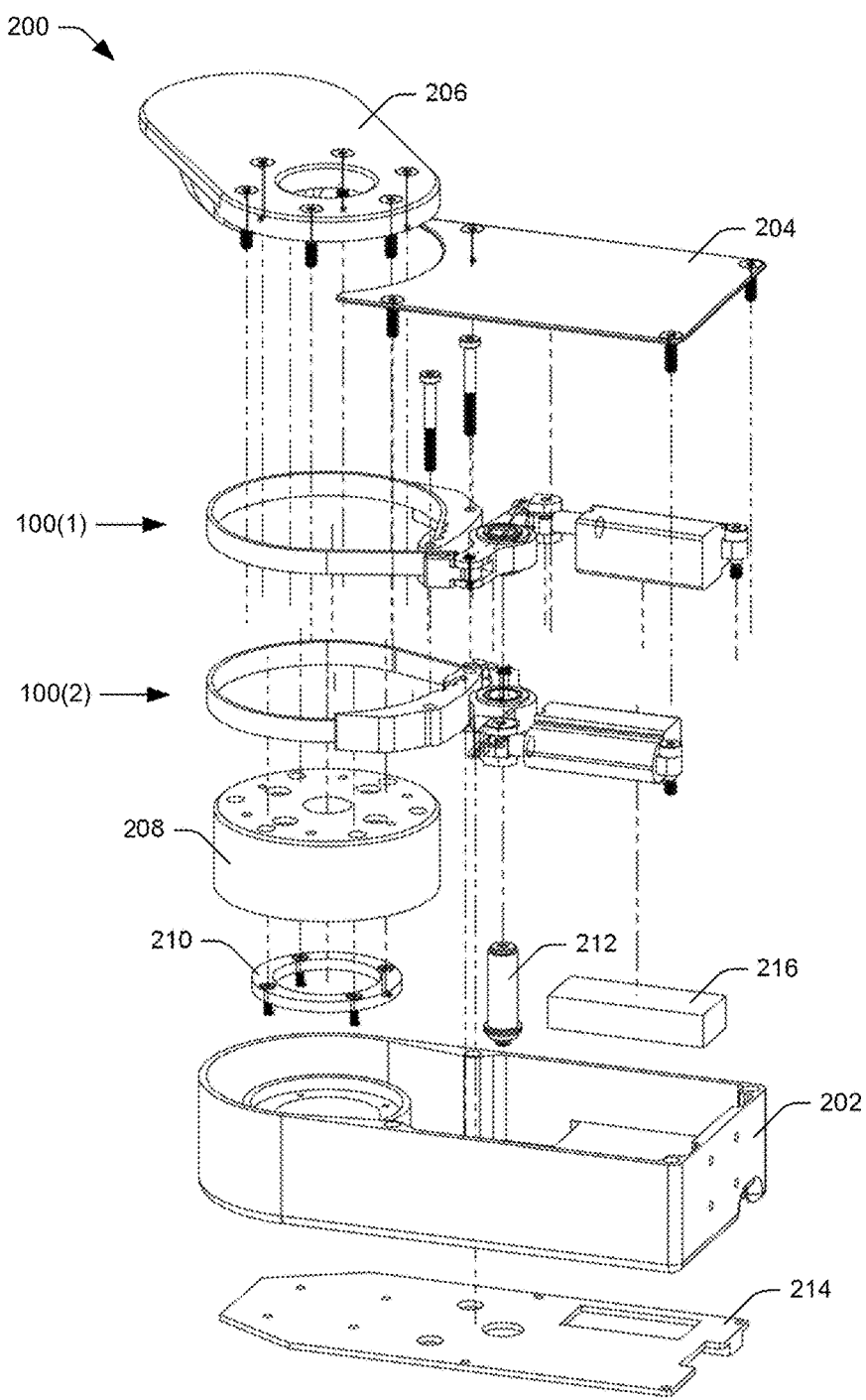
FIG. 2 illustrates an exploded view showing example components of a rotatable joint, including the braking assemblies of FIG. 1, according to an embodiment of the present disclosure.

FIG. 2 illustrates an exploded view of example components of a rotatable joint 200 that may utilize the first braking assembly 100(1) and/or the second braking assembly 100(2). In some instances, the rotatable joint 200 may resemble a mechanical component capable of performing movements similar to those of human joints. For example, the rotatable joint 200 may include linkages, joints, and/or members and, in some instances, one or more motor(s) that allow for rotational and translational movement. In some instances, the rotatable joint 200 may be integrated within devices, wearables, exoskeletons, and/or braces that are worn by human to augment human movement.

The rotatable joint 200 may include a housing 202 within which components of the rotatable joint 200 reside. For example, the housing 202 may include a cavity or interior within which one or more of the components reside. In some instances, the first braking assembly 100(1) and the second braking assembly 100(2) may reside (completely or partially) within the housing 202. The housing 202 may also provide a frame (e.g., mount, base, case, etc.) to which components of the rotatable joint 200 couple.

A cover 204 may couple to the housing 202 to seal or enclose the cavity of the housing 202. In some instances, the cover 204 may couple to the housing 202 using fasteners (e.g., screws, bolts, pins, magnets, rivets, snap-fit, etc.).

An arm 206 may protrude or extend from the housing 202, for example, from within the cavity of the housing 202. The arm 206 may be coupled to a hub 208 that is configured to rotate and which provides rotational movement of the rotatable joint 200. For example, the arm 206 may couple and secure to the hub 208 via one or more fasteners. The hub 208 may couple to the arm 206 for providing translational movement of the arm 206 in one or more directions (e.g., rotating about the Z-axis in clockwise and/or counter-clockwise direction(s)). This coupling may perform similar movements as a human joint. The first braking assembly 100(1) and/or the second braking assembly 100(2) may be controlled to supply real time braking forces to hold the hub 208 at a certain predetermined position for disposing the arm 206 at certain locations, as instructed by the controller (not shown).

The hub 208 may resemble a rotor, pin, post, drum, or other cylindrical object that is capable of rotating in clockwise and/or counter-clockwise directions within the first brake band 106(1) and/or the second brake band 106(2) (about the Z-axis) or depending on the point of view, the first brake band 106(1) and/or the second brake band 106(2) may slide around the circumference of the hub 208. However, in some embodiments the hub 208 may be ovular, egg-shaped, ellipsoidal, etc. or other shape that may be rotatable and/or represent a moveable portion of the rotatable joint 200. Additionally, the hub 208 may be a variably sized hub and include two or more sections and a mechanism (e.g., hydraulics, springs, camming surfaces, etc.) that selectively draw the sections together or push the sections apart. This adjustment may change an effective circumference of the hub 208 and permit different controllable braking forces to be applied to the rotatable joint. That is, in some instances, the circumference of the hub 208 may be increased to brake the rotatable joint, or the circumference of the hub 208 may be decreased to permit movement of the rotatable joint. However, in some instances, a speed at which the hub 208 rotates may affect the circumference and therefore, the braking forces. For example, mechanisms (e.g., springs) may hold the two halves in close relationship during relative low speeds, but as the hub 208 rotates faster, the centripetal force may cause the two halves to have a greater degree of separation.

In some instances, the hub 208 may be connected to a motor and when the motor is energized, the motor may rotate the hub 208. In such instances, the hub 208 may be coupled to the motor via linkages, gears, stators, shafts, cables, belts and so forth. In some instances, the motor may be disposed within an interior cavity of the hub 208 or other parts of the housing 202. In some instances, the motor may represent a brushed or brushless DC motor, such as a permanent magnet, stepper, series, shut, or compound motor. However, other motors or actuation methods may be used. In some instances, the motor (or other portions of the rotatable joint 200) may include sensor(s) for measuring position, speed, force, and/or torque. However, the hub 208 may be configured to operate without the motor to provide rotational movement to the rotatable joint 200.

The hub 208 is sized and configured to extend through areas of or be received by the first braking assembly 100(1) and/or the second braking assembly 100(2), such as the area 110 discussed above in relation to FIG. 1. In some instances, the area 110 may be circular in shape for engaging with the circular shape of the hub 208. When the first braking assembly 100(1) and the second braking assembly 100(2) are not activated (e.g., not braking), the hub 208 and the arm 206 may be free to move (e.g., turn or spin). However, when one or both of the first braking assembly 100(1) and/or the second braking assembly 100(2) are activated, the first brake band 106(1) and/or the second brake band 106(2) may respectively tighten around the hub 208. This tightening (e.g., holding, fixing, etc.) may arrest the hub 208. In some instances, the first braking assembly 100(1) and/or the second braking assembly 100(2) may dampen or restrain the hub 208 with varying amounts of force to provide a varying amount of stiffness to the rotatable joint 200.

In some instances, a retaining ring 210 may seat or locate the hub 208 within the housing 202. For example, the housing 202 may have a channel or groove within which the retaining ring 210 rests. The housing 202 may also include bearings that assist or allow rotational movement of the hub 208.

The rotatable joint 200 further includes a pin 212 about which lever arms (e.g., the first lever arm 104(1) and the second lever arm 104(2)) of the first braking assembly 100(1) and/or the second braking assembly 100(2) may pivot to tighten and loosen the first brake band 106(1) and the second brake band 106(2), respectively, around the hub 208. For example, the pin 212 may couple to the housing 202 and the first lever arm 104(1) of the first braking assembly 100(1) and the second lever arm 104(2) of the second braking assembly 100(2) may pivot about the pin 212. Discussed above, this pivoting nature of the first lever arm 104(1) and the second lever arm 104(2) may tighten or loosen the first brake band 106(1) and the second brake band 106(2) around the hub 208, respectively. In some instances, the first lever arm 104(1) and/or the second lever arm 104(2) may couple or pivot about the pin 212 using bushings, bearings, and so forth.

The rotatable joint 200 may also include a printed circuit board assembly (PCBA) 214 and/or a battery 216. The PCBA 214 may mount to or be disposed within the housing 202 and may function to control the braking force applied to the rotatable joint 200. For example, the PCBA 214 may include components such as one or more motor drivers, brake drivers, analog-to-digital converters, digital-to-analog converters, controllers, processor(s), memory, and communications interfaces, among other control circuitry components. In some instances, the PCBA 214 may include controller(s) configured to direct the operation the first braking assembly 100(1) and the second braking assembly 100(2) to control an amount of braking force applied to the hub 208, or other rotational components of the rotatable joint 200. For example, the controller(s) may direct the first braking assembly 100(1) and/or the second braking assembly 100(2) to brake, hold, dampen, or restrain movement of the rotatable joint 200 by tightening the first brake band 106(1) and/or the second brake band 106(2) around the hub 208, respectively. Additionally, the controller(s) may also direct the operation of motor(s) to move a certain rotational distance, stop at certain positions, impedance control, position control, torque control, etc.

In some instances, with the dual-band design of the rotatable joint 200 (i.e., the first brake band 106(1) of the first braking assembly 100(1) and the second brake band 106(2) of the second braking assembly 100(2)), the PCBA 214 may include a closed loop microcontroller that dynamically and independently controls braking force applied by the first brake band 106(1) and the second brake band 106(2). This control may result in different levels of braking depending upon the direction of rotation of the hub 208. In some instances, however, the controller may direct the first braking assembly 100(1) and/or the second braking assembly 100(2) to brake and/or loosen based on control and communications signals from another controller and/or computing systems. Additionally, or alternatively, the braking force applied by the first brake band 106(1) and the second brake band 106(2) may be dependent of one another.

The PCBA 214 may also receive data from various sensor(s) of the rotatable joint 200 or sensor(s) of other devices. For example, the PCBA 214 (or a controller thereof) may receive position, speed, movement, and other data from sensor(s) of the motor and/or the hub 208. The rotatable joint 200 may also include other sensor(s) for determining a position of the rotatable joint 200 and/or the arm 206, orientation of the rotatable joint 200, force applied by the first braking assembly 100(1) and/or the second braking assembly 100(2), weight held by the hub 208, and so forth. This data (or other data) may be used for controlling an amount of braking applied by the first braking assembly 100(1) and/or the second braking assembly 100(2).

Although FIG. 2 illustrates the rotatable joint 200 including two braking assemblies (e.g., the first braking assembly 100(1) and the second braking assembly 100(2)), in some instances, the rotatable joint 200 may include one braking assembly (e.g., one of the first braking assembly 100(1) or the second braking assembly 100(2)) or more than two braking assemblies. Additionally, or alternatively, the first brake band 106(1) and/or the second brake band 106(2) may be tightened using mechanisms other than linear actuators, such as worm screws, rotary actuators, cams (e.g., eccentric cam), ratcheting mechanism, or other tensioners. Additionally, or alternatively, mechanisms other than the first brake band 106(1) and/or the second brake band 106(2) may apply the braking force to the hub 208. For example, pads, cables, cords, etc. may be used for pressing against or tightening around the hub 208. Additionally, or alternatively, the first brake band 106(1) and/or the second brake band 106(2) (or cables, etc.) may compress a frictional pad or other braking mechanism against the hub 208 to prevent rotation. Still, in some instances, the first brake band 106(1) and/or the second brake band 106(2) may wrap around the hub 208 more than once (e.g., twice).

The housing 202 may include mounts or brackets to which the hub 208, the first braking assembly 100(1), the second braking assembly 100(2), the pin 212, the PCBA 214, the battery 216, and/or other components couple. In some instances, the first braking assembly 100(1), the second braking assembly 100(2), the PCBA 214, the battery 216, and/or other components of the rotatable joint 200 may couple to the housing 202 using fasteners (e.g., screws, bolts, etc.), adhesives, snap-fit, magnets, compression fit, and so forth. Additionally, in some instances, the housing 202 may include alignment tabs for aligning or positioning the components within the housing 202.

In some instances, the housing 202 may be manufactured from materials including, but not limited to, plastic, composites, metal, and/or combinations thereof. In some instances, the first brake band 106(1) and/or the second brake band 106(2) may be formed from a flexible material, such rubber, leather either natural or synthetic, flexible plastic, composites, metals, or other materials. Additionally, or alternatively, the first brake band 106(1) and/or the second brake band 106(2) may be formed from a thin metal or other, more rigid, material. However, the first brake band 106(1) and/or the second brake band 106(2) may include a structural rigidity to permit the first brake band 106(1) and/or the second brake band 106(2) to be pushed and pulled to loosen and tighten around the hub 208. In some instances, the first brake band 106(1) and the second brake band 106(2) may be flexible to conform to a shape or profile of the rotatable member of the rotatable joint 200 (e.g., the hub 208). However, the first brake band 106(1) and the second brake band 106(2) may be flexible, or semi-rigid to conform to a variety of shapes and increase the contact area with the hub 208.

Additionally, or alternatively, the first brake band 106(1) and/or the second brake band 106(2) may have a smooth, or coarse surface that contacts the hub 208, depending upon braking needs. In some instances, the surface of the first brake band 106(1) and/or the second brake band 106(2) may include detents, ridges, or other surface features to control an amount of friction applied to the hub 208. Additionally, or alternatively, the hub 208 may have grooves or channels in which the first brake band 106(1) and/or the second brake band 106(2) reside, respectively. In some instances, the channels may help locate the first brake band 106(1) and the second brake band 106(2) around the hub 208 and/or increase a friction, or braking force, applied.

Figure 3A:
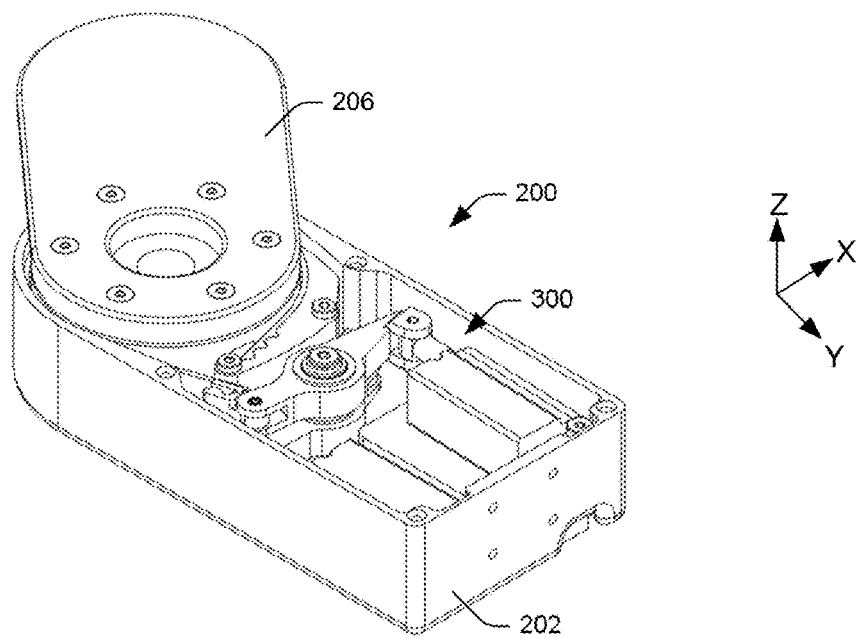
FIG. 3A illustrates an example housing of the rotatable joint of FIG. 2, showing the example components of FIG. 2 disposed within or coupled to the housing, according to an embodiment of the present disclosure.
Figure 3B:
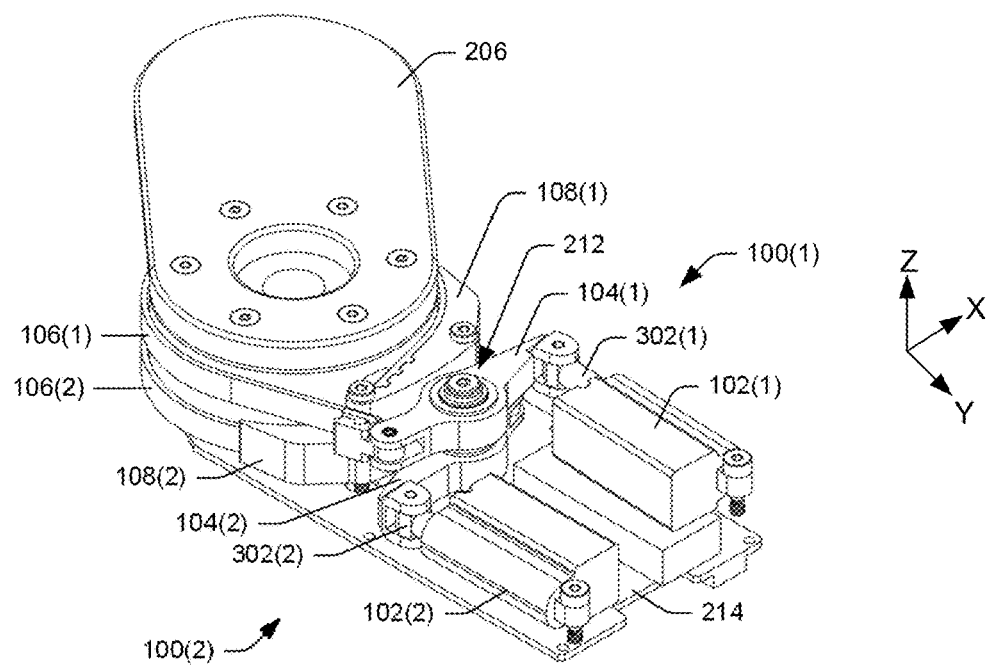
FIG. 3B illustrates the example components of the rotatable joint of FIG. 2, according to an embodiment of the present disclosure.

FIGS. 3A and 3B illustrate components of the rotatable joint 200. In FIG. 3A, the cover 204 is shown removed to depict components within the housing 202. In FIG. 3B, the cover 204 and the housing 202 are shown removed to depict components of the rotatable joint 200.

As shown in FIG. 3A, the housing 202 includes an interior 300 occupied by components of the rotatable joint 200. For example, the first braking assembly 100(1) and the second braking assembly 100(2) may reside within the interior 300 and couple to portions of the housing 202. The hub 208 is further shown residing within the housing 202 and extending above a top surface of the housing 202 for coupling to the arm 206. The components of the rotatable joint 200 may compactly fit within the housing 202 to reduce a form factor of the housing 202, or portions of the rotatable joint 200. However, within the housing 202, the first braking assembly 100(1) and the second braking assembly 100(2) may have enough room (e.g., clearance, tolerances, etc.) for actuating and braking around the hub 208.

As shown in FIG. 3B, the first braking assembly 100(1) may include the first linear actuator 102(1) having a first shaft 302(1) that extends from an end of the first linear actuator 102(1). The first shaft 302(1) may extend at various lengths from the first linear actuator 102(1), via an actuation of the first linear actuator 102(1) and as instructed by the controller. The first linear actuator 102(1) may be non-backdrivable for holding in position when power is not supplied. The first braking assembly 100(1) may further include the first lever arm 104(1) and the first brake band 106(1). The first shaft 302(1) may operably couple to an end of the first lever arm 104(1), at an end opposite where the first brake band 106(1) couples to the first lever arm 104(1). In some instances, the first shaft 302(1) may couple to a first arm of the first lever arm 104(1) while the first brake band 106(1) may couple to a second arm of the first lever arm 104(1).

As shown, and as previously discussed, the first brake band 106(1) may encircle or surround at least a portion of the hub 208. A first end (e.g., free end) of the first brake band 106(1) may couple to the first lever arm 104(1) and a second end (e.g., fixed end) of the first brake band 106(1) may couple to the first support 108(1). The first support 108(1) is attached to the housing 202 to remain stationary and to anchor the second end of the first brake band 106(1) in place while the first braking assembly 100(1) (e.g., the first linear actuator 102(1)) is actuated. The first lever arm 104(1) may also pivotably couple about the pin 212 for providing rotational movement to permit the first brake band 106(1) to be pulled and loosened around the hub 208. For example, the first lever arm 104(1) may be pivotable about the pin 212, between the first arm and the second arm of the first lever arm 104(1).

The second braking assembly 100(2) may include similar components as the first braking assembly 100(1), such as the second linear actuator 102(2) having a second shaft 302(2) that extends from an end of the second linear actuator 102(2). The second shaft 302(2) may extend at various lengths from the second linear actuator 102(2) via an actuation of the second linear actuator 102(2), and as instructed by the controller. Similarly, the second linear actuator 102(2) may be non-backdrivable for holding in position when power is not supplied. The second braking assembly 100(2) may further include the second lever arm 104(2) and the second brake band 106(2). The second shaft 302(2) may operably couple to an end of the second lever arm 104(2), at an end opposite to where the second brake band 106(2) couples to the second lever arm 104(2).

As shown, the second brake band 106(2) may encircle or surround at least a portion of the hub 208. A first end (e.g., free end) of the second brake band 106(2) may couple to the second lever arm 104(2) and a second end (e.g., fixed end) of the second brake band 106(2) may couple to the second support 108(2) attached to the housing 202. The second support 108(2) attached to the housing 202 to remain stationary and to anchor the second distal end of the second brake band 106(2) in place while the second braking assembly 100(2) is actuated. The second lever arm 104(2) may also pivotably couple about the pin 212 for providing rotational movement to permit the second brake band 106(2) to be pulled and loosened around the hub 208. For example, the second lever arm 104(2) may be pivotable about the pin 212, between the first arm and the second arm of the second lever arm 104(2).

In some instances, mechanical fastener(s) (e.g., bolt, screw, etc.) may be inserted through the first support 108(1) and/or the second support 108(2) to couple the first support 108(1) and the second support 108(2) to the housing 202. This coupling may attach the first support 108(1) and the second support 108(2) to the housing 202 to allow the first brake band 106(1) and the second brake band 106(2) to be pulled around the hub 208. The first support 108(1) and/or the second support 108(2) may include holes through which the mechanical fasteners extend for coupling to the housing 202.

The first braking assembly 100(1) is shown residing above (e.g., vertically in the Z-direction) the second braking assembly 100(2). Additionally, although the first braking assembly 100(1) and the second braking assembly 100(2) include similar components, FIG. 3B, for example, illustrates that the first braking assembly 100(1) and the second braking assembly 100(2) are rotated or flipped in relation to one another. For example, the first brake band 106(1) may wrap around the hub 208 in a first direction and configured to tighten or apply force to the hub 208 in the first direction, while the second brake band 106(2) may wrap around the hub 208 in a second direction and configured to tighten or apply force to the hub 208 in the second direction. Therefore, given the orientations of the first braking assembly 100(1) and the second braking assembly 100(2), one of the first braking assembly 100(1) or the second braking assembly 100(2) may apply more braking force depending on the direction that the hub 208 is spinning.

In some instances, the PCBA 214 may couple to a bottom of the housing 202, within the interior 300 and below (Z-direction) the first braking assembly 100(1) and the second braking assembly 100(2). Components of the first braking assembly 100(1) and/or the second braking assembly 100(2) may communicatively couple to the PCBA 214. For example, the first linear actuator 102(1) may communicatively couple to the PCBA 214 to allow the controller to control the first linear actuator 102(1) to extend and retract the first shaft 302(1) at various lengths. The second linear actuator 102(2) may similarly communicatively couple to the PCBA 214 to extend and retract the second shaft 302(2). The battery 216 also couples to the PCBA 214 for powering components of the rotatable joint 200 (e.g., the motor, the first linear actuator 102(1), the second linear actuator 102(2), etc.).

In some instances, the PCBA 214 and/or the rotatable joint 200 may include additional computing components for controlling an operation of the rotatable joint 200 or the first braking assembly 100(1) and/or the second braking assembly 100(2). By way of example, the rotatable joint 200 may include various sensor(s) for controlling an operation of the rotatable joint 200, or components thereof. In some instances, the rotatable joint 200 may include sensors to measure a tension within the first brake band 106(1) and/or the second brake band 106(2) for determining an amount of braking force (e.g., torque) applied to the hub 208 (e.g., force/toque sensor, strain gauges, etc.). Additionally, or alternatively, sensor(s) may measure an angle (or relative angular position) of the arm 206 (e.g., encoder). Furthermore, sensor(s) may measure an orientation of the rotatable joint 200 (e.g., gyroscope).

Figure 4:
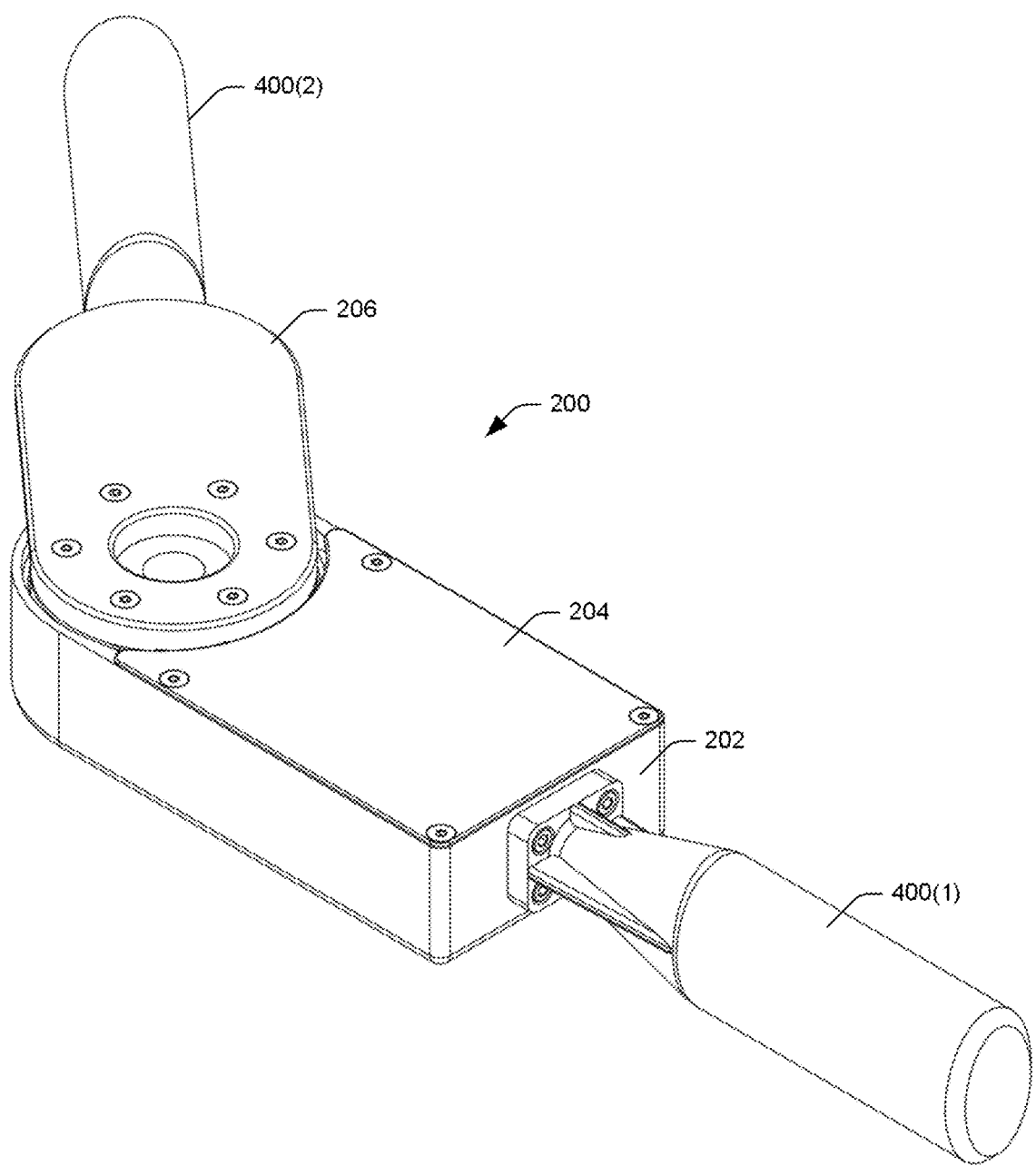
FIG. 4 illustrates two members joined by a rotatable joint including a braking assembly, according to an embodiment of the present disclosure.

FIG. 4 illustrates the example rotatable joint 200, showing the cover 204 coupled to the housing 202 to seal the interior 300. The housing 202 provides a frame or area within which components of the rotatable joint 200 may reside once the rotatable joint 200 is assembled.

Generally, the rotatable joint 200 resembles a mechanical component capable of performing movements similar to those of human joints. The rotatable joint 200 may include linkages, joints, and/or members and, in some instances, one or more motor(s) that allow for rotational and translational movement. In some instances, the rotatable joint 200 may include the housing 202, components residing within the housing 202 (as discussed above), the arm 206, a first member 400(1), and/or a second member 400(2). In some instances, the rotatable joint 200 may represent a component of an exoskeleton worn by a human, and/or may represent a component integrated within robotic system.

The rotatable joint 200 be rotated, for example, through rotational movement of the hub 208. In some instances, members, other arms, end effectors, or linkages may be coupled to the arm 206 (or other portions of the housing 202). In some instances, the hub 208 and the arm 206 may be actuatable by the one or more motor(s) disposed within the housing 202. In some instances, the one or more motor(s) may include direct current (DC) motors and, in some cases, gearboxes.

In some instances, the rotatable joint 200 permits a first member 400(1) to move with respect to a second member 400(2) and as the rotatable joint 200 is permitted to move. Similarly, when the rotatable joint 200 is restricted from moving (e.g., via the first braking assembly 100(1) and/or the second braking assembly 100(2)), the first member 400(1) may be restricted from moving with respect to the second member 400(2). The second member 400(2) may couple to the housing 202, and in some instances, may be in fixed relationship to the housing 202. However, in some instances, the second member 400(2) may couple to an additional arm, an additional hub, and/or one or more additional motor(s).

Additionally, although FIG. 4 illustrates the first member 400(1) and the second member 400(2) disposed at certain angles or extending in certain directions from the housing 202, the first member 400(1) and/or the second member 400(2) may take different shapes, bends, curves, and so forth for providing different movements.

Given that the rotatable joint 200 may be worn by humans, integrated within robotic system, and embodied in exoskeletons, the rotatable joint 200 (or components thereof) may have a small form factor and be lightweight. For example, heavy or bulky systems may be uncomfortable to wear and/or fatigue the users. Comparatively, small, compact, and/or lightweight systems may be comfortably worn and reduce muscle fatigue and joint wear or inflammation. When integrated within robotic systems, the size of the rotatable joint 200 may allow picking and placing of heavy items without large, costly and dangerous actuators.

Reducing the size of the rotatable joint 200 may include removing gearboxes and/or transmission systems that control (or restrict) unwanted movement of the rotatable joint 200, such as resistance to backdrive. For example, conventional braking systems may include motors and/or gearboxes that prevent backdrive when the motor is powered off.

However, gears are often bulky, heavy, and may interfere with making a compact design, an effective control system, or movement. To overcome these and other deficiencies, the rotatable joint 200 may include the first braking assembly 100(1) and/or the second braking assembly 100(2), providing the rotatable joint 200 with a dual-band brake that uses one or multiple non-backdrivable linear actuators to lock the system and permit free back-drivable motion when not engaged. However, in some instances and as noted above, other mechanisms may be used for applying the braking forces to the hub 208 (e.g., cam).

The first braking assembly 100(1) and/or the second braking assembly 100(2) may halt or arrest movement of the rotatable joint 200, even in instances where power is not being supplied. This arrest may prevent the arm 206 from rotating or maneuvering, thereby locking the arm 206 (or the rotatable joint 200) in place. The amount of arrest may be controlled electronically by an embedded controller and other computer systems that variably controls a damping (e.g., an amount of braking). As such, the rotatable joint 200 may be fully locked, fully unlocked, and/or locked at varying degrees to provide for a range of behaviors. In some instances, in the fully locked state, an additional mechanism, such as a ratcheting mechanism, may be used to prevent unlocking (e.g., when carrying heavy loads).

The rotatable joint 200 shown in FIG. 4 is one example of a joint (or device) that may incorporate a braking assembly (or assemblies). In some instances, the rotatable joint 200 may be integrated into braces, supports, exoskeletons, or other wearables that are worn by humans for assisting in joint movement. The rotatable joint 200 may additionally or alternatively be integrated with or within robotic systems. For example, the rotatable joint 200 may represent or be incorporated into an end effector (e.g., a robotic hand, a grasping mechanism, vacuums, welding torches, grippers, etc.), or other parts of a robotic arm, for picking and placing items or positioning the joints.

In some instances, a robotic system may incorporate more than one rotatable joint 200. For example, the rotatable joint 200 may permit rotational movement about single axis (Z-axis). By coupling one or more rotatable joints (e.g., the rotatable joint 200) end-to-end, or in unison, robotic systems may have more than one degree of freedom.

Figure 5:
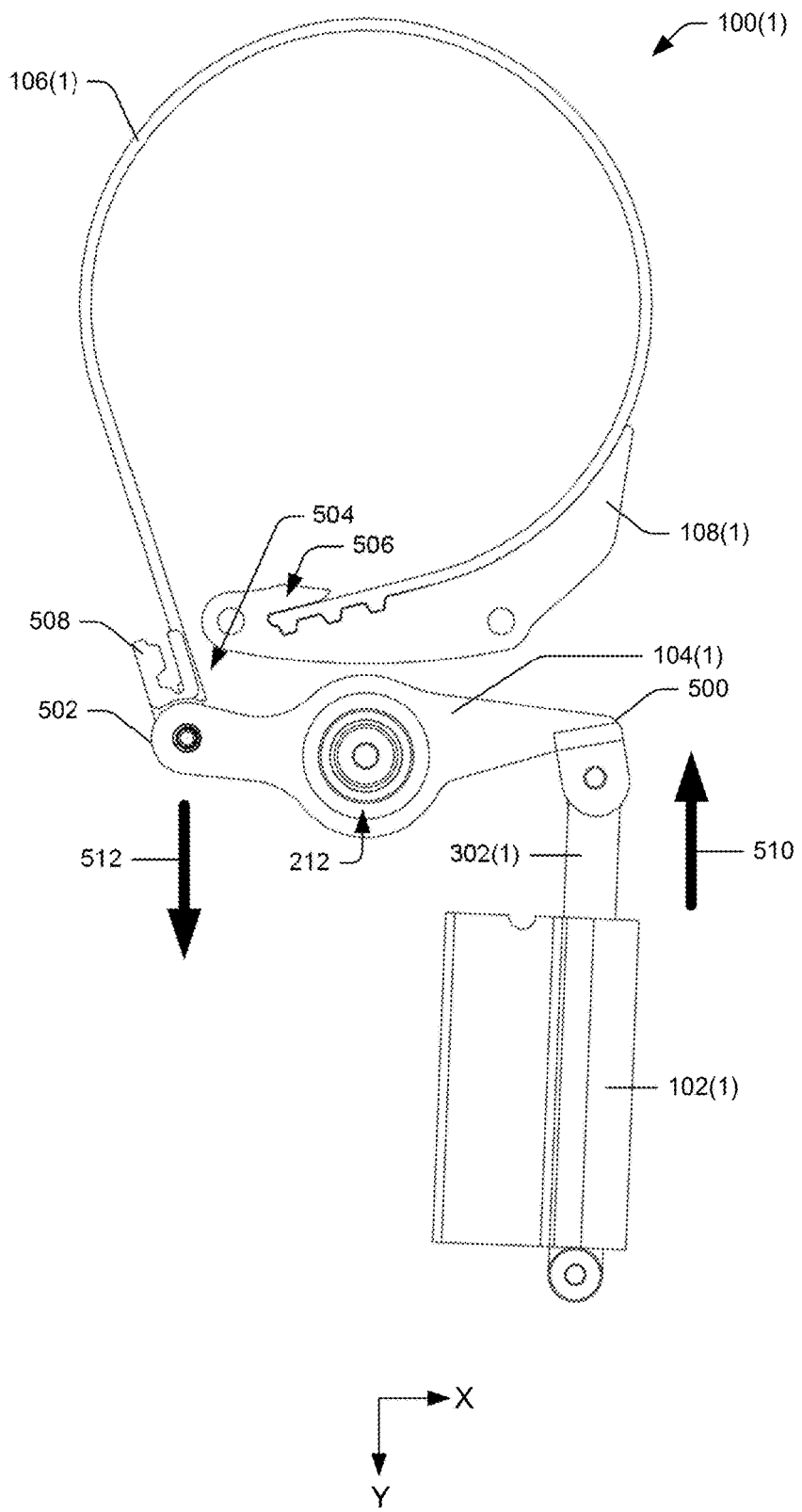
FIG. 5 illustrates an assembly or mechanism for selectively tightening a brake band around a rotatable joint, according to an embodiment of the present disclosure.

FIG. 5 illustrates in greater detail an embodiment of the first braking assembly 100(1) and an operation of the first braking assembly 100(1) to resist movement of the hub 208 or apply a real time selective braking force to the rotatable joint 200. Although FIG. 5 relates to the discussion and the operation of the first braking assembly 100(1), it is to be understood that the second braking assembly 100(2) may function similarly to the first braking assembly 100(1) to resist movement of the hub 208 and control a stiffness of the rotatable joint 200.

The first braking assembly 100(1) includes the first linear actuator 102(1) that operably couples to the first end of the first lever arm 104(1). The first lever arm 104(1) may include a first end 500 and second end 502 opposite the first end 500. In some instances, the first end 500 may be disposed on a first arm of the first lever arm 104(1) and the second end 502 may be disposed on a second arm of the first lever arm 104(1). In some instances, the first arm and the second arm may be of similar and/or of different lengths.

The first end 500 may couple to the first shaft 302(1). In some instances, the first shaft 302(1) may pivotably or hingedly couple to the first end 500 of the first lever arm 104(1) (e.g., using pins, hinges, bushings, etc.). At the second end 502, the first lever arm 104(1) may couple to the free end of the first brake band 106(1). For example, the first brake band 106(1) is shown including a free end 504 (e.g., a first distal end) and a fixed end 506 (e.g., a second distal end). The free end 504 of the first brake band 106(1) may couple to the second end 502 of the first lever arm 104(1) via a pivotable connector 508. The pivotable connector 508, in some instances, may pivotably or hingedly couple the free end 504 of the first brake band 106(1) to the second end 502 of the first lever arm 104(1). The fixed end 506 of the first brake band 106(1) is configured to be retained within the first support 108(1). The fixed end 506 may be affixed to the first support 108(1) so as to not be moveable when the first braking assembly 100(1) is actuated.

In some instances, the free end 504 and/or the fixed end 506 of the first brake band 106(1) may include features (e.g., protrusions, ridges, etc.) that engage with corresponding features of pivotable connector 508 and/or the first support 108(1), respectively. For example, as shown, the fixed end 506 of the first brake band 106(1) may include ridges that engage within receptacles of the first support 108(1) for coupling the first brake band 106(1) to the first support 108(1). These ridges, for example, may resist movement of the fixed end 506 as the first brake band 106(1) tightens and loosens around the hub 208.

The first brake band 106(1) extends between the free end 504 and the fixed end 506, around the area 110 (e.g., around the hub 208). As shown in FIG. 5, the first brake band 106(1) may generally include a circular shape for engaging with the hub 208. However, the first brake band 106(1) may take other shapes for engaging and confirming to the hub 208, or other rotatable members. Additionally, as shown, the first brake band 106(1) may not completely encase or surround the area 110. The first brake band 106(1) may also extend around the area more than or less than as shown in FIG. 5 (or the additional figures herein). For example, the first brake band 106(1) may extend around a single side, or portion of a perimeter, of the area 110.

Between the first end 500 and the second end 502 of the first lever arm 104(1), the first lever arm 104(1) is pivotable about the pin 212. The first lever arm 104(1) may include an opening for receiving the pin 212. In some instances, bearings and/or bushings may couple the first lever arm 104(1) about the pin 212. On either side of the pin 212, the first lever arm 104(1) includes the first end 500 (or first arm) and the second end 502 (or second arm) for coupling to the first linear actuator 102(1) and the free end 504 of the first brake band 106(1), respectively. In some instances, a length (e.g., X-direction) of the first lever arm 104(1) may be increased for adjusting a force applied when braking around the hub 208. Additionally, or alternatively, the first shaft 302(1) may couple to different portions, or at a different location, of the first lever arm 104(1) than shown.

FIG. 5 illustrates that to tighten the first brake band 106(1) around the hub 208, the first linear actuator 102(1) may extend the first shaft 302(1) in a first direction 510 (Y-direction). Extending the first shaft 302(1) in the first direction 510 forces the first end 500 of the first lever arm 104(1) to substantially move in the first direction 510, and pivot or rotate in a first direction about the pin 212 (e.g., counter-clockwise). Correspondingly, the pivotable coupling of the first lever arm 104(1) about the pin 212 forces the second end 502 of the first lever arm 104(1) in a second direction 512 (opposite Y-direction), in response to the extension of the first shaft 302(1). The second direction 512 may be substantially opposite the first direction 510. As the free end 504 of the first brake band 106(1) couples to the second end 502 of the first lever arm 104(1), moving the second end 502 of the first lever arm 104(1) in the second direction 512 pulls the first brake band 106(1) around the hub 208. This pulling may bring the first brake band 106(1), or potions thereof, into tighter contact with the hub 208 to arrest a rotational movement of the hub 208.

Additionally, the first shaft 302(1) may extend to varying lengths such that the first brake band 106(1) may apply varying amounts of braking force to the hub 208. The first linear actuator 102(1) therefore offers a granular or continuously-controllable range of forces for dampening or restraining movement of the hub 208 (or the rotatable joint 200). Additionally, when the first linear actuator 102(1) is not powered, the first linear actuator 102(1) retains or holds a position of the first shaft 302(1). This non-backdrivable nature of the first linear actuator 102(1) maintains a braking of the hub 208 even in instances when power is turned off.

Retracting the first shaft 302(1) into the first linear actuator 102(1), in a direction opposite the first direction 510, pulls on the first end 500 of the first lever arm 104(1) and causes the first lever arm 104(1) to rotate clockwise about the pin 212. Therein, the second end 502 of the first lever arm 104(1) translates in a direction opposite the second direction 512 and forces the first brake band 106(1) to loosen around the hub 208. The first brake band 106(1) may be of sufficient size that when loosened, allows sufficient clearance for the hub 208 to rotate freely.

Figure 6A:
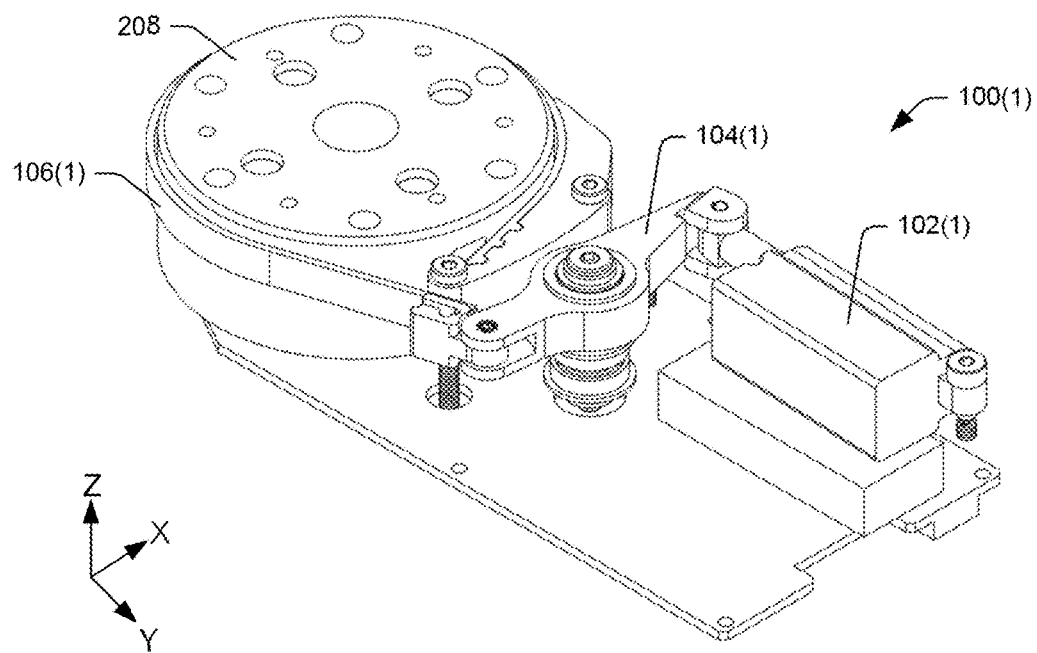
FIG. 6A illustrates a first braking assembly around a hub of a rotatable joint to selectively control a force required to move the hub in a clockwise direction, according to an embodiment of the present disclosure.
Figure 6B:
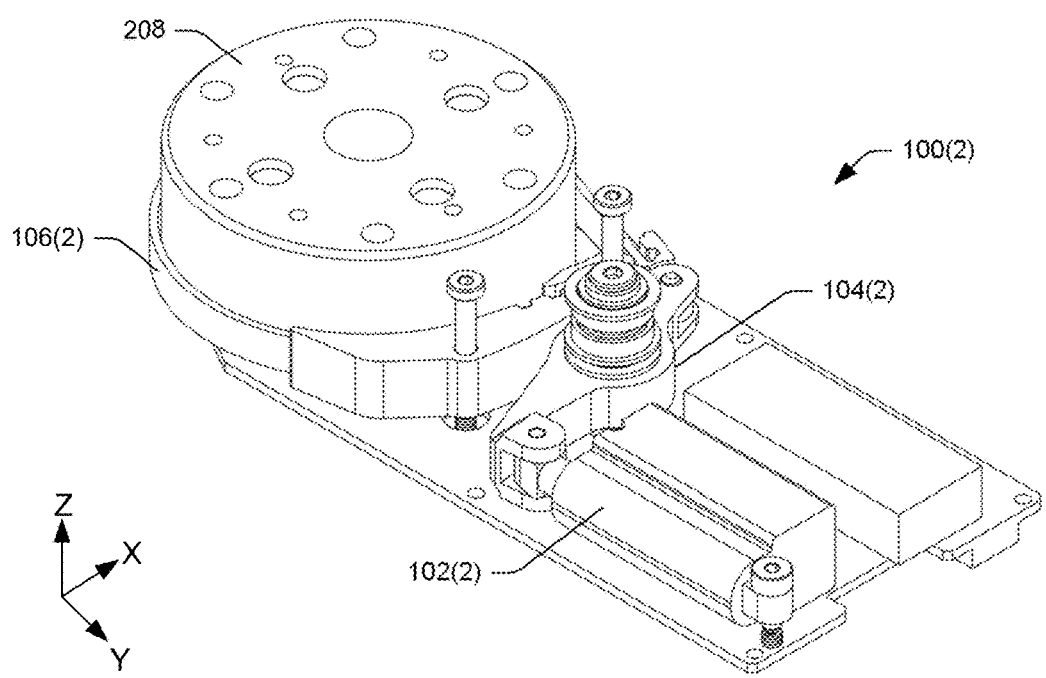
FIG. 6B illustrates a second braking assembly around a hub of a rotatable joint to selectively control a force required to move the hub in a counter-clockwise direction, according to an embodiment of the present disclosure.

FIGS. 6A and 6B illustrate the first braking assembly 100(1) and the second braking assembly 100(2), respectively. FIG. 6A illustrates the first braking assembly 100(1) and the first brake band 106(1) disposed around the hub 208. In FIG. 6A, the second braking assembly 100(2) is removed to discuss and illustrate the first braking assembly 100(1). FIG. 6B illustrates the second braking assembly 100(2) and the second brake band 106(2) disposed around the hub 208. In FIG. 6B, the first braking assembly 100(1) is removed to discuss and illustrate the second braking assembly 100(2).

As shown in FIG. 6A, the first brake band 106(1) of the first braking assembly 100(1) extends substantially around a periphery of the hub 208. The first linear actuator 102(1) of the first braking assembly 100(1) is configured to transition the first braking assembly 100(1) between an open configuration and a braking configuration. In the open configuration, the first brake band 106(1) is loose enough to allow sufficient clearance for the hub 208 to rotate freely (e.g., within the area 110). On the other hand, the first brake band 106(1) may be pulled and tightened, via actuation of the first linear actuator 102(1), around the hub 208 in the braking configuration. Particularly, with the fixed end 506 of the first brake band 106(1) anchored to the first support 108(1), a force by the movement of the first lever arm 104(1) is applied to tighten the first brake band 106(1) around the hub 208. For example, the second end 502 of the first lever arm 104(1) pulls on the free end 504 of the first brake band 106(1) to cause the first brake band 106(1) to close around the hub 208.

As shown in FIG. 6B, the second brake band 106(2) of the second braking assembly 100(2) extends substantially around a periphery of the hub 208 grounded at the opposite end. Noted above with regard to FIG. 5, the second braking assembly 100(2) may function similarly to the first braking assembly 100(1). For example, the second linear actuator 102(2) of the second braking assembly 100(2) is configured to transition the second braking assembly 100(2) between an open configuration and a braking configuration. In the open configuration, the second brake band 106(2) is loose enough to allow sufficient clearance for the hub 208 to rotate freely. The second brake band 106(2) may be pulled and tightened, via actuation of the second linear actuator 102(2) around the hub 208 in the braking configuration. For example, a first end (or first arm) of the second lever arm 104(2) may couple to the second rod 304(1) of the second linear actuator 102(2), and a second end (or second arm) of the second lever arm 104(2) may couple to a first distal end of the second brake band 106(2). A fixed end of the second brake band 106(2), is anchored to the second support 108(2). As the second linear actuator 102(2) is extended, a force is applied to tighten the second brake band 106(2) around the hub 208. For example, the second arm of the second lever arm 104(2) pulls on the free end of the second brake band 106(2) to cause the second brake band 106(2) to close around the hub 208.

As shown, in some instances, the first braking assembly 100(1) and the second braking assembly 100(2) may be flipped or rotated in relation to one another. For example, the second braking assembly 100(2) may be flipped about the Y-axis, relative to the first braking assembly 100(1). The first braking assembly 100(1) may tighten the first brake band 106(1) in a first direction around the hub, while the second braking assembly 100(2) may tighten the second brake band 106(2) in a second opposite direction around the hub. In other words, the first brake band 106(1) may extend around the hub 208 in a first direction and the second brake band 106(2) may extend around the hub 208 in a second direction. In some instances, the first braking assembly 100(1) may pull the first brake band 106(1) in a substantially counterclockwise direction, while the second braking assembly 100(2) may pull the second brake band 106(2) in a substantially clockwise direction. In turn, the first brake band 106(1) and the second brake band 106(2) may be respectively pulled or tightened around the hub 208. However, in some instances, the first braking assembly 100(1) and/or the second braking assembly 100(2) may be brake in the same direction.

Utilizing the first braking assembly 100(1) and the second braking assembly 100(2), as well as their respective braking directions, the first braking assembly 100(1) and the second braking assembly 100(2) may control the force required to rotate the rotatable joint 200 in both clockwise and counterclockwise direction. As will be appreciated by those skilled in the art, the braking force applied by each of the first brake band 106(1) and the second brake band 106(2) is greater when the hub 208 is moved in a direction that is opposite to the direction that the first brake band 106(1) and the second brake band 106(2) is being pulled, respectively. By having the first brake band 106(1) and the second brake band 106(2) wound in opposite directions, one of the first brake band 106(1) and the second brake band 106(2) can apply greater braking force (depending on how much it is tightened). In some instances, both the first brake band 106(1) and the second brake band 106(2) are tightened equally. In other situations, the first brake band 106(1) and the second brake band 106(2) may not be tightened equally so that required less force to rotate the rotatable joint 200 in one direction than the other.

Figure 7A:
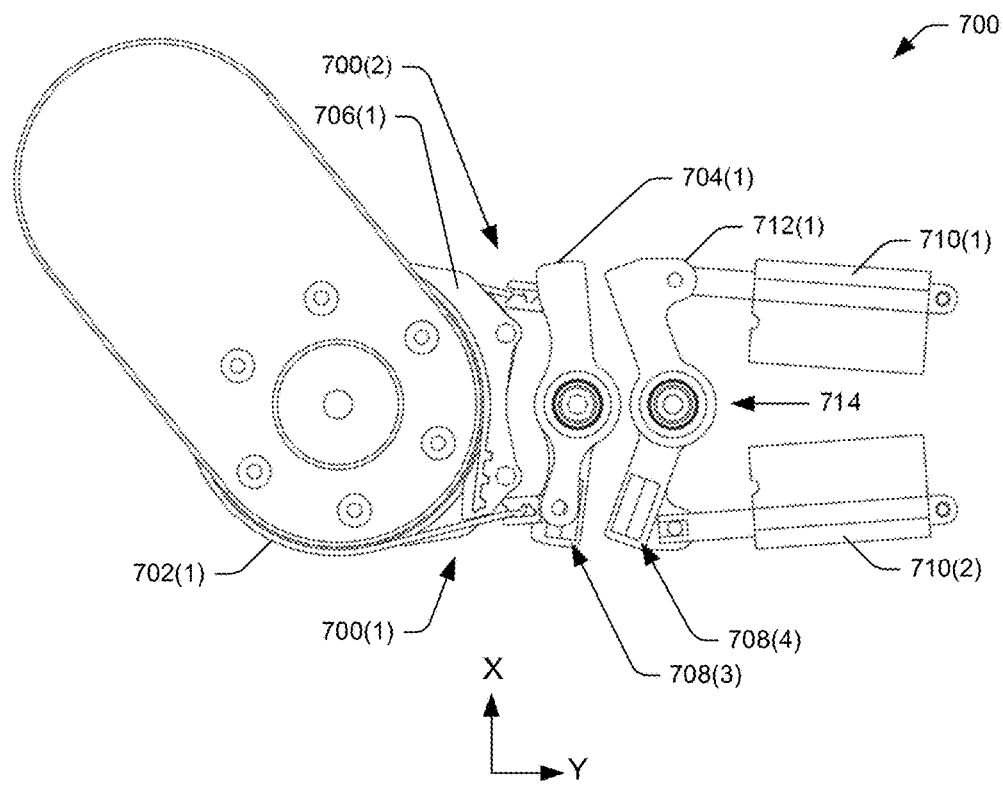
FIGS. 7A and 7B illustrates a pair of braking assemblies that use a magnetic coupling to apply a controllable braking force to a rotatable joint, according to an embodiment of the present disclosure.
Figure 7B:
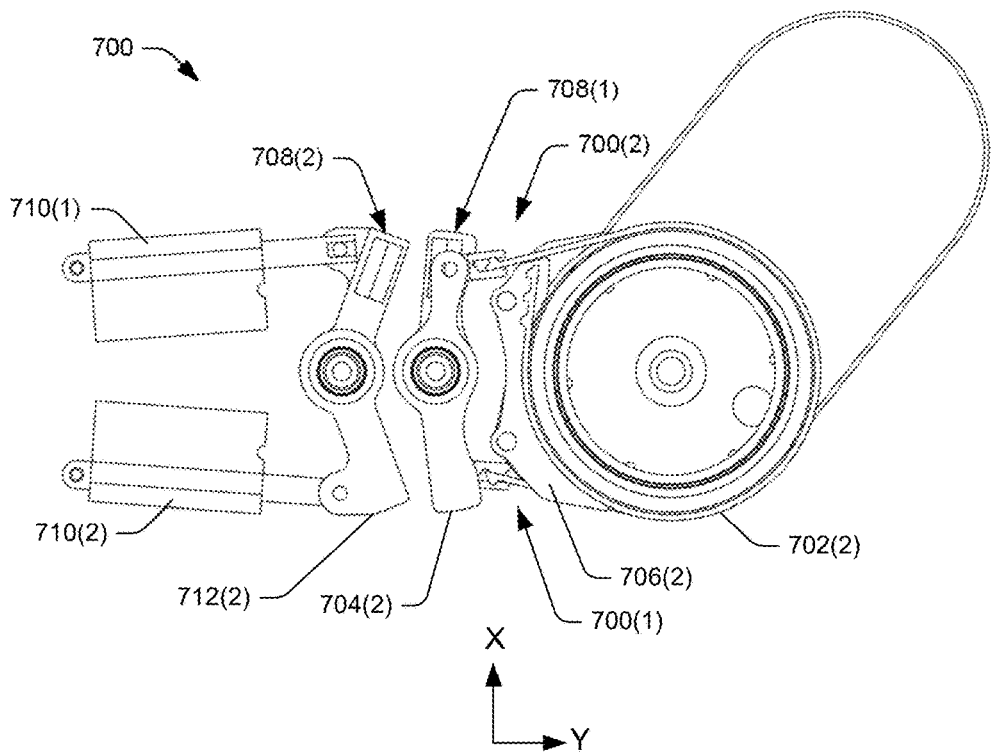

FIGS. 7A and 7B illustrates another embodiment of a rotatable joint 700, which includes similar components and functions similarly as discussed above with regard to the rotatable joint 200. For example, the rotatable joint 700 may include a housing, an arm coupled to a hub, as well as braking assemblies for controlling a stiffness of the rotatable joint 700. However, as discussed herein, instead of coupling linear actuator(s) to the brake bands with a mechanical linkage, this embodiment of the rotatable joint 700 utilizes magnetic element(s) for coupling the brake bands to the linear actuator.

For example, as shown in FIGS. 7A and 7B, the rotatable joint 700 includes a first braking assembly 700(1) and a second braking assembly 700(2). The first braking assembly 700(1) may include components similar to the first braking assembly 100(1) and/or the second braking assembly 700(2) may include components similar to the second braking assembly 100(2), as discussed above. In this embodiment, magnets are used to transmit a force from linear actuator to a lever arm that selectively tightens the brake band. For example, the first braking assembly 700(1) may include a first brake band 702(1) having a free end coupled to a first arm of a first lever arm 704(1) and a fixed end coupled to a first support 706(1) that is secured to a housing. A second arm of the first lever arm 704(1) extends from a central pivot point and includes one or more magnets 708(1) at or near the end of the second arm. The shaft of a first linear actuator 710(1) actuator couples to a first actuating arm 712(1) (only having one arm) that pivots about a pivot point 714. At the end of the arm of the first actuating arm 712(1) are one or more magnets 708(2) that are aligned to provide a repelling force to the one or more magnets 708(1) in the first lever arm 704(1). Movement of the first linear actuator 710(1) shaft causes the one or more magnets 708(2) to move toward the one or more magnets 708(1). The repelling force of the one or more magnets 708(1) and the one or more magnets 708(2) pushes the arm of the first lever arm 104(1) away and provides a force to tighten the first brake band 702(1) around the hub.

The second braking assembly 700(2) includes similar components, such as a second brake band 702(2), a second lever arm 704(2), a second support 706(2), one or more magnets 708(3) disposed on a second linear actuator 710(2), one or more magnets 708(4) disposed on a second actuating arm 712(2). However, the second brake band 702(2) may wind in an opposite direction as the first brake band 702(1).

The opposing magnets provide a force which does not vary linearly with the distance moved by the shafts of the first linear actuator 710(1) and the second linear actuator 710(2). Therefore, the magnetically coupled arrangement shown in FIGS. 7A and 7B can allow the designer to program for different forces on the brake bands with movement of the first linear actuator 710(1) and the second linear actuator 710(2).

In some instances, the first braking assembly 700(1) and the second braking assembly 700(2), or the rotatable joint 700, may include permanent magnets or electromagnets for applying the braking force around the hub.

FIGS. 8A and 8B illustrate integrating one or more rotatable joints 800 into a brace 802 that is worn by a user 804 according an example embodiment of the present disclosure. In some instances, the rotatable joint 800 may be similar to and/or include similar components as the rotatable joint 200 and/or the rotatable joint 700.

In some instances, the rotatable joints 800 may be utilized to assist the user 804 in picking and placing items in a handling facility. Additionally, or alternatively, the rotatable joints 800 may find use in assisting joint movement (e.g., physical therapy, rehabilitation, etc.). As shown, the rotatable joints 800 may be integrated into the brace 802, such as a vest or other wearable, that is worn by the user 804. The rotatably joints 800 may operably couple to an arm 806 that is utilized to control, assist, or support portions of the user 804 (e.g., shoulder, forearm, upper arm, etc.). In some instances, the rotatable joints 800 may also be configured or designed for other joints of the user 804, such as knees, neck, back, shoulder, elbow, and so forth. In such instances, the braces may include more than one rotatable joint 800 and/or more than one arm 806.

Figure 9:
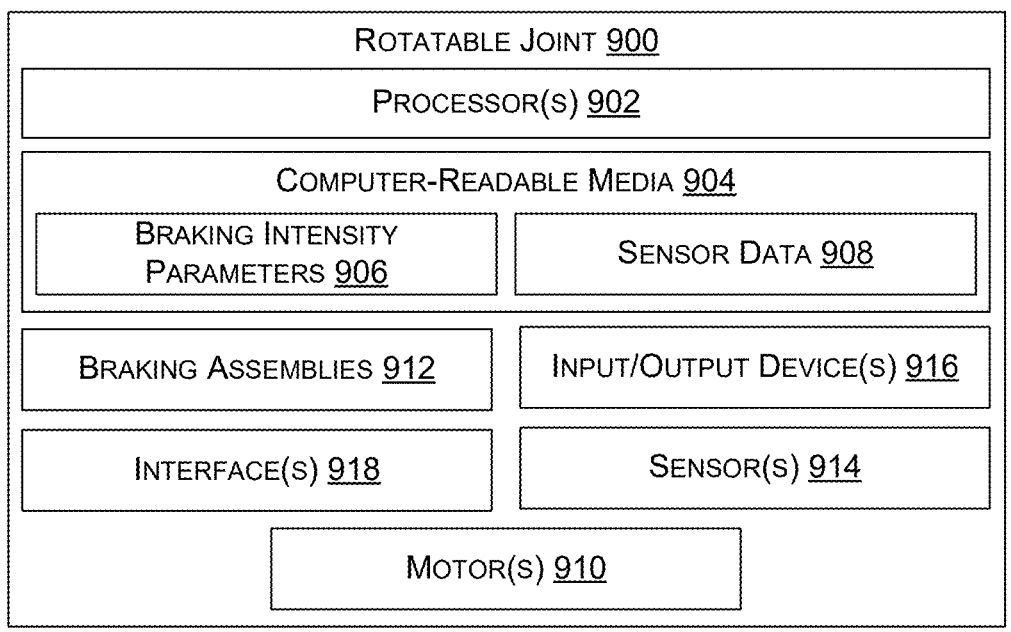
FIG. 9 illustrates selected computing components of a rotatable joint, according to an embodiment of the present disclosure.

FIG. 9 illustrates example computing components of a rotatable joint 900. In some instances, the rotatable joint 900 may be similar to, represent, or include similar features as the rotatable joint 200, the rotatable joint 700, and/or the rotatable joint 800.

As shown, the rotatable joint 900 may include processor(s) 902 and computer-readable media 904. The processor(s) 902 may perform various operations described herein, such as controlling braking assemblies of the rotatable joint 900. The computer-readable media 904 may store or otherwise have access to various information, including instructions that, when executed, cause the processor(s) 902 to perform the operations described herein.

For example, the computer-readable media 904 may store braking intensity parameters 906 and/or sensor data 908. The braking intensity parameters 906 may correspond to data associated with controlling an amount of braking or tension to apply via braking assemblies 912 of the rotatable joint 900 (e.g., the first braking assembly 100(1), the second braking assembly 100(2), the first braking assembly 700(1), and/or the second braking assembly 700(2)).

The sensor data 908 may correspond to data received from various sensors of the rotatable joint 900. For example, the sensor data 908 may correspond to an orientation of the rotatable joint 900, a position of motor(s) 910 of the rotatable joint 900, a position of hubs of the rotatable joint 900, an amount of tension applied to band(s) of the braking assemblies, a weight carried by the rotatable joint 900, and so forth. Various sensor(s) 914 may collect the sensor data 908 for storing in the computer-readable media 904. In some instances, the processor(s) 902 may utilize the braking intensity parameters 906 and/or the sensor data 908 for controlling an operation of the rotatable joint 900. However, the computer-readable media 904 may store additional data related to controlling the operation of the rotatable joint 900, or the motor(s) 910 of the rotatable joint 900.

In some instances, the rotatable joint 900 may include various input/output (I/O) devices 916. The I/O device(s) 916 may include lights that output an operational status of the rotatable joint 900, buttons and/or controls for actuating or controlling the rotatable joint 900 (e.g., increasing stiffness), audio and/or video jacks, charging ports, loudspeakers, and so forth.

Interface(s) 918 may also communicatively couple the rotatable joint 900 to computing device(s) (e.g., personal computer, mobile device, laptop, tablet, mobile phone, watch, etc.). In such instances, the computing devices may control or provide instructions to the rotatable joint 900 for controlling the braking assemblies 912.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A brake mechanism for applying a selective braking force to a rotatable joint, comprising:
   a first brake including:
      a first brake band having a first fixed end and a first free end, the first brake band being configured to apply a first braking torque to at least a first portion of a hub of the rotatable joint in a clockwise direction, the first fixed end and the first free end being disposed on a first plane,
      a first linear actuator configured to supply a first force to tighten the first brake band around the hub in the clockwise direction, and
      a first lever arm having:
         a first arm coupled to the first free end, and
         a second arm coupled to the first linear actuator;
   a second brake including:
      a second brake band having a second fixed end and a second free end, the second brake band being configured to apply a second braking torque to at least a second portion of the hub of the rotatable joint in a counter-clockwise direction, the second fixed end and the second free end being disposed on a second plane spaced apart from the first plane,
      a second linear actuator configured to supply a second force to tighten the second brake band around the hub in the counter-clockwise direction, and
      a second lever arm having:
         a third arm coupled to the second free end, and
         a fourth arm coupled to the second linear actuator; and
   a controller for selectively controlling the first linear actuator and the second linear actuator to apply a desired braking force to the hub.

2. The brake mechanism of claim 1, further comprising a pin, wherein:
   the first lever arm rotates about the pin during actuation of the first linear actuator; and
   the second lever arm rotates about the pin during actuation of the second linear actuator.

3. The brake mechanism of claim 1, wherein:
   actuation of the first linear actuator in a first direction causes the first free end to move in a second direction to apply the first braking torque;
   actuation of the first linear actuator in a third direction causes the second free end to move in a fourth direction to apply the second braking torque;
   the second direction is opposite the first direction; and
   the fourth direction is opposite the third direction.

4. The brake mechanism of claim 1, wherein:
   the first arm includes a first length that is less than a second length of the second arm; and
   the third arm includes a third length that is less than a fourth length of the fourth arm.

5. A device comprising:
   a housing including:
      a first end,
      a second end opposite the first end,
      a first side,
      a second side opposite the first side,
      a top, and
      a bottom opposite the top;
   a rotatable member located closer to the first end than the second end;
   a first braking assembly disposed within the housing, the first braking assembly including:
      a first brake band wrapped around the rotatable member, the first brake band having a first fixed end and a first free end; and
      a first actuator for controllably tightening the first free end around the rotatable member, the first free end being located closer to the first side than the second side, wherein actuating the first actuator in a first direction causes the first brake band to tighten around the rotatable member and actuating the first actuator in a second direction that is different than the first direction causes the first brake band to loosen around the rotatable member; and
   a second braking assembly disposed within the housing, closer to the bottom than the first braking assembly, the second braking assembly including:
      a second brake band wrapped around the rotatable member, the second brake band having a second fixed end and a second free end; and
      a second actuator for controllably tightening the second free end around the rotatable member, the second free end being located closer to the second side than the first side, wherein actuating the second actuator in the first direction causes the second brake band to tighten around the rotatable member and actuating the second actuator in the second direction causes the second brake band to loosen around the rotatable member.

6. The device of claim 5, further comprising a first support coupled to the housing and a second support coupled to the housing, wherein:
   the first fixed end couples to the first support; and
   the second fixed end couples to the second support.

7. The device of claim 5, wherein:
   the first free end couples to the first actuator through a first lever arm having a first arm and a second arm that pivot around a first pivot point; and
   the second free end couples to the second actuator through a second lever arm having a third arm and a fourth arm that pivot around a second pivot point.

8. The device of claim 7, wherein the first actuator and the second actuator comprise at least one of a linear actuator, eccentric cam, cable, or a motor.

9. The device of claim 8, wherein:
   the first free end couples to the first arm;
   the first actuator couples to the second arm;
   the second free end couples to the third arm; and
   the second actuator couples to the fourth arm.

10. The device of claim 5, further comprising a controller configured to independently controllably tighten the first brake band and the second brake band.

11. The device of claim 5, wherein:
    the first free end couples to a first lever arm;
    the second free end couples to a second lever arm;
    the first lever arm includes first arms having first magnets that interact with second magnets of a third lever arm to tighten or loosen the first brake band around the rotatable member; and
    the second lever arm includes second arms having third magnets that interact with fourth magnets of a fourth lever arm to tighten or loosed the second brake band around the rotatable member.

12. The device of claim 11, wherein:
    the first arms are of unequal length; and
    the second arms are of unequal length.

13. The device of claim 5, wherein:
    the first brake band at least partially wraps around the rotatable member in a counter-clockwise direction; and the second brake band at least partially wraps around the rotatable member in a clockwise direction.

14. The device of claim 5, wherein the first braking assembly is disposed vertically above the second braking assembly within the housing.

15. The device of claim 5, further comprising an arm coupled to the rotatable member, and disposed adjacent to the top of the housing.

16. A mechanical joint comprising:
   a first brake band including:
      a first length that surrounds at least a first portion of a hub, and
      a first free end;
   a first actuator configured to actuate in a first direction to displace a first magnetic element to apply a first force to the first free end in a second direction, the second direction being opposite the first direction;
   a second brake band including:
      a second length that surrounds at least a second portion of the hub, and
      a second free end; and
   a second actuator configured to actuate in a third direction to displace a second magnetic element to apply a second force to the second free end in a fourth direction, the fourth direction being opposite the third direction.

17. The mechanical joint of claim 16, further comprising:
   a first lever arm including:
      a first arm coupled to the first free end, and
      a second arm having the first magnetic element;
   a second lever arm including:
      a third arm coupled to the second free end, and
      a fourth arm having the second magnetic element;
   a third lever arm including:
      a fifth arm coupled to the first actuator, and
      a third magnetic element that opposes the first magnetic element; and
   a fourth lever arm including:
      a sixth arm coupled to the second actuator, and
      a fourth magnetic element that opposes the second magnetic element.

18. The mechanical joint of claim 16, wherein at least one of the first actuator or the second actuator is non-backdrivable.

19. The mechanical joint of claim 16, further comprising a first lever arm including a first arm coupled to the first free end, and a second lever arm including a second arm coupled to the second free end, wherein:
   the first force is applied in a first direction;
   the second force is applied in a second direction;
   a plane is defined through a center of the hub, a first center of rotation of the first lever arm, and a second center of rotation of the second lever arm;
   the first direction is in line with the plane; and
   the second direction is in line with the plane.

20. The mechanical joint of claim 16, further comprising a controller for selectively controlling the first actuator and the second actuator to apply a desired braking force to the hub.

* * * * *